US010417767B2

(12) United States Patent
Nie et al.

(10) Patent No.: US 10,417,767 B2
(45) Date of Patent: Sep. 17, 2019

(54) SYSTEMS AND METHODS FOR IMAGE SEGMENTATION

(71) Applicant: Shenzhen United Imaging Healthcare Co., Ltd., Shenzhen, Guangdong (CN)

(72) Inventors: Weiwen Nie, Guangdong (CN); Ce Wang, Guangdong (CN); Enwei Zhao, Guangdong (CN)

(73) Assignee: SHENZHEN UNITED IMAGING HEALTHCARE CO., LTD., Shenzhen (CN)

( * ) Notice: Subject to any disclaimer, the term of this patent is extended or adjusted under 35 U.S.C. 154(b) by 3 days.

(21) Appl. No.: 15/716,501

(22) Filed: Sep. 26, 2017

(65) Prior Publication Data
US 2018/0189953 A1  Jul. 5, 2018

(30) Foreign Application Priority Data
Dec. 29, 2016 (CN) .......................... 2016 1 1243258

(51) Int. Cl.
*G06T 7/11* (2017.01)
*G06T 7/136* (2017.01)
*G06T 7/174* (2017.01)

(52) U.S. Cl.
CPC ................ *G06T 7/11* (2017.01); *G06T 7/136* (2017.01); *G06T 7/174* (2017.01); *G06T 2207/10081* (2013.01); *G06T 2207/10088* (2013.01); *G06T 2207/10104* (2013.01); *G06T 2207/20156* (2013.01); *G06T 2207/20161* (2013.01)

(58) Field of Classification Search
CPC . G06T 7/11; G06T 7/174; G06T 7/136; G06T 2207/20161; G06T 2207/10088; G06T 2207/10104; G06T 2207/20156; G06T 2207/10081
USPC .......................................................... 382/173
See application file for complete search history.

(56) References Cited

U.S. PATENT DOCUMENTS

| 9,418,420 B2 | 8/2016 | Brown | |
|---|---|---|---|
| 2005/0259855 A1* | 11/2005 | Dehmeshki | G06K 9/342 382/131 |

(Continued)

FOREIGN PATENT DOCUMENTS

| CN | 102397070 A | 4/2012 |
|---|---|---|
| CN | 104112265 A | 10/2014 |
| CN | 104915989 A | 9/2015 |

(Continued)

OTHER PUBLICATIONS

International Search Report for PCT/CN2017/102775 dated Nov. 29, 2017, 4 pages.

(Continued)

*Primary Examiner* — Amandeep Saini
(74) *Attorney, Agent, or Firm* — Metis IP LLC

(57) ABSTRACT

A method for image segmentation includes acquiring a three-dimensional (3D) image that includes a plurality of two-dimensional (2D) images arranged in a spatial order. The method also includes determining a preliminary seed point in a first 2D image of the plurality of 2D images. The method further includes determining, based on the preliminary seed point, a final seed point in a second 2D image of the plurality of 2D images, and determining, based on the final seed point, a volume of interest (VOI) in the 3D image.

21 Claims, 15 Drawing Sheets

(56) References Cited

U.S. PATENT DOCUMENTS

2009/0147001 A1    6/2009  Buelow et al.
2013/0060121 A1    3/2013  Patwardhan et al.

FOREIGN PATENT DOCUMENTS

CN      106709930 A    5/2017
KR     20160005256 A    1/2016

OTHER PUBLICATIONS

Written Opinion for PCT/CN2017/102775 dated Nov. 29, 2017, 5 pages.
First Office Action in Chinese Application No. CN201611243258.X dated May 13, 2019, 12 pages.

* cited by examiner

SYSTEMS AND METHODS FOR IMAGE SEGMENTATION

CROSS-REFERENCE TO RELATED APPLICATIONS

This application claims priority to Chinese Application No. 201611243258.X filed on Dec. 29, 2016, the contents of which are incorporated herein by reference in its entirety.

TECHNICAL FIELD

The present disclosure generally relates to systems and methods for medical imaging, and in particular, systems and methods for image segmentation.

BACKGROUND

Determination of a volume of interest (VOI) (e.g., a tumor site) in a three-dimensional (3D) medical image may help a user (e.g., a doctor, an imaging engineer) analyze the VOI better. The VOI may be segmented based on a seed point determined by the user based on his or her experience. Different seed points selected by the user may cause different results of determination of the VOI, which often renders the determination of the VOI inconsistent and, in some occasions, inaccurate. Therefore, it is desirable to provide systems and methods for image segmentation that can improve the accuracy and the stability of the determination of the VOI in an image.

SUMMARY

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

According to a first aspect of the present disclosure, a system for image segmentation may include a storage device and one or more processors configured to communicate with the storage device. The storage device may include a set of instructions. When executing the set of instructions, the one or more processors may be directed to cause the system to perform one or more of the following operations. The one or more processors may acquire a three-dimensional (3D) image including a plurality of two-dimensional (2D) images arranged in a spatial order. The one or more processors may determine a preliminary seed point in a first 2D image of the plurality of 2D images. The one or more processors may determine, based on the preliminary seed point, a final seed point in a second 2D image of the plurality of 2D images. The one or more processors may determine, based on the final seed point, a volume of interest (VOI) in the 3D image.

In some embodiments, to determine the final seed point in the second 2D image of the plurality of 2D images based on the preliminary seed point, the one or more processors may determine a preliminary VOI based on the preliminary seed point. The one or more processors may determine a characteristic point of the preliminary VOI. The one or more processors may designate the characteristic point of the preliminary VOI as the final seed point.

In some embodiments, the characteristic point of the preliminary VOI may be a geometric center of the preliminary VOI or a center of gravity of the preliminary VOI.

In some embodiments, to determine the final seed point in the second 2D image of the plurality of 2D images based on the preliminary seed point, the one or more processors may initiate an iteration process for determining the final seed point. The iteration process may include a plurality of iterations. Each iteration of the plurality of iterations may include: determining, based on a previous seed point, a preliminary VOI in the 3D image, the previous seed point being the preliminary seed point in a first iteration of the plurality of iterations or a seed point determined in a previous iteration; and determining, based on the preliminary VOI, a next seed point, the next seed point being a characteristic point of the preliminary VOI. The one or more processors may designate the seed point determined in a last iteration of the plurality of iterations as the final seed point.

In some embodiments, at least one of the plurality of iterations may further include: displaying the seed point determined in the at least one of the plurality of iterations to a user; receiving, from the user, an input related to the seed point determined in the at least one of the plurality of iterations; and terminating, based on the received input, the iteration process.

In some embodiments, at least one of the plurality of iterations may further include: determining the number of iterations that have been performed; determining whether the number of iterations that have been performed is equal to or greater than a threshold; and terminating, based on a determination that the number of iterations that have been performed is equal to or greater than the threshold, the iteration process.

In some embodiments, to determine the final seed point in the second 2D image of the plurality of 2D images based on the preliminary seed point, the one or more processors may select, from the plurality of 2D images, one or more 2D images close to the first 2D image. The selected one or more 2D images may be within a threshold slice count away from the first 2D image. The one or more processors may determine gray values of pixels in the selected one or more 2D images and the first 2D image. The one or more processors may determine, in the selected one or more 2D images and the first 2D image, a pixel having one of: a maximum value among the gray values, a minimum value among the gray values, or an average value of the gray values. The one or more processors may designate the determined pixel as the final seed point.

In some embodiments, to determine the final seed point in the second 2D image of the plurality of 2D images based on the preliminary seed point, the one or more processors may select, from the plurality of 2D images, one or more 2D images close to the first 2D image. The selected one or more 2D images may be within a threshold slice count away from the first 2D image. The one or more processors may determine, in each of the selected one or more 2D images, a pixel corresponding to the preliminary seed point. The one or more processors may determine, in each of the selected one or more 2D images, an area including a plurality of pixels that are within a threshold distance from the corresponding pixel. The one or more processors may determine, in the first 2D image, an area including a plurality of pixels that are within the threshold distance from the preliminary seed point. The one or more processors may determine gray values of pixels in the determined areas in the selected one or more 2D images and the determined area in the first 2D image. The one or more processors may determine, in the determined areas in the selected one or more 2D images and the determined area in the first 2D image, a pixel having one of: a maximum value among the gray values, a minimum value among the gray values, or an average value of the gray values. The one or more processors may designate the determined pixel as the final seed point.

In some embodiments, the threshold distance may be a Euclidean distance, the area in each of the selected one or more 2D images may be a circle having a radius of the threshold distance and a center at the corresponding pixel to the preliminary seed point, and the area in the first 2D image may be a circle with the radius of the threshold distance centered at the preliminary seed point.

In some embodiments, the threshold distance may be a chess board distance having a number of pixels, the area in the each of the selected one or more 2D images may be a square having a center at the corresponding pixel to the preliminary seed point and four sides with a length of 2T+1 pixels, T may be the number of pixels of the threshold distance, and the area in the first 2D image may be a square having a center at the preliminary seed point and four sides with a length of 2T+1 pixels.

In some embodiments, the 3D image may be a Magnetic Resonance (MR) image, a Computed Tomography (CT) image, or a Positron Emission Tomography (PET) image.

In some embodiments, to determine the VOI in the 3D image based on the final seed point, the one or more processors may segment the 3D image based on the final seed point. The one or more processors may generate the VOI according to a result of the segmentation.

In some embodiments, to determine the VOI in the 3D image based on the final seed point, the one or more processors may segment, based on the final seed point, one or more 2D images of the plurality of 2D images. The one or more processors may generate, based on a result of the segmentation, one or more regions of interest (ROIs). The one or more processors may generate, based on the generated one or more ROIs, the VOI.

In some embodiments, to determine the final seed point in the second 2D image of the plurality of 2D images based on the preliminary seed point, the one or more processors may select, from the plurality of 2D images, one or more 2D images close to the first 2D image. The selected one or more 2D images may be within a threshold slice count away from the first 2D image. The one or more processors may determine a gray value distribution diagram based on the first 2D image or one of the selected one or more 2D images. The one or more processors may designate a pixel in first 2D image or one of the selected one or more 2D images as the final seed point based on the gray value distribution diagram.

In some embodiments, to determine the VOI in the 3D image based on the final seed point, the one or more processors may determine a preliminary segmentation threshold based on the final seed point. The one or more processors may obtain a weight associated with the VOI in the 3D image. The one or more processors may initiate an iteration process for determining the VOI. The iteration process may include a plurality of iterations. Each iteration of the plurality of iterations may include determining, based on a region-growing algorithm and a previous segmentation threshold, a foreground region and a background region by segmenting the 3D image. The previous segmentation threshold may be the preliminary segmentation threshold in a first iteration of the plurality of iterations or a segmentation threshold determined in a previous iteration. Each iteration of the plurality of iterations may also include determining a first average value of gray values of pixels in the foreground region and a second average value of gray values of pixels in the background region. Each iteration of the plurality of iterations may also include determining a new segmentation threshold based on the first average value, the second average value, and the weight. The one or more processors may designate the foreground region determined in a last iteration of the plurality of iterations as the VOI in the 3D image.

In some embodiments, at least one of the plurality of iterations may further include determining whether a difference between the previous segmentation threshold and the new segmentation threshold is less than a threshold of difference. At least one of the plurality of iterations may further include terminating the iteration process in response to a determination that the difference between the previous segmentation threshold and the new segmentation threshold is less than the threshold of difference.

In some embodiments, at least one of the plurality of iterations may further include determining whether an iteration count of iterations that have been performed is greater than a threshold iteration count. At least one of the plurality of iterations may further include terminating the iteration process in response to a determination that the iteration count of iterations that have been performed is greater than the threshold iteration count.

In some embodiments, at least one of the plurality of iterations may further include determining whether the weight is greater than a threshold weight. At least one of the plurality of iterations may further include terminating the iteration process in response to a determination that the weight is greater than the threshold weight.

According to another aspect of the present disclosure, a method for image segmentation may include one or more of the following operations. One or more processors may acquire a three-dimensional (3D) image including a plurality of two-dimensional (2D) images arranged in a spatial order. The one or more processors may determine a preliminary seed point in a first 2D image of the plurality of 2D images. The one or more processors may determine, based on the preliminary seed point, a final seed point in a second 2D image of the plurality of 2D images. The one or more processors may segment, based on the final seed point, a volume of interest (VOI) in the 3D image.

According to yet another aspect of the present disclosure, a non-transitory computer-readable medium may comprise at least one set of instructions. The at least one set of instructions may be executed by one or more processors of a computer server. The one or more processors may acquire a three-dimensional (3D) image including a plurality of two-dimensional (2D) images arranged in a spatial order. The one or more processors may determine a preliminary seed point in a first 2D image of the plurality of 2D images. The one or more processors may determine, based on the preliminary seed point, a final seed point in a second 2D image of the plurality of 2D images. The one or more processors may determine, based on the final seed point, a volume of interest (VOI) in the 3D image.

According to yet another aspect of the present disclosure, a system for image segmentation may comprise: an image acquisition module configured to acquire a three-dimensional (3D) image including a plurality of two-dimensional (2D) images arranged in a spatial order; a preliminary point determination module configured to determine a preliminary seed point in a first 2D image of the plurality of 2D images; a final point determination module configured to determine, based on the preliminary seed point, a final seed point in a second 2D image of the plurality of 2D images; and a segmentation module configured to determine, based on the final seed point, a volume of interest (VOI) in the 3D image.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is to describe particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "module," and/or "block" used herein are one method to distinguish different components, elements, parts, section or assembly of different level in ascending order. However, the terms may be displaced by another expression if they achieve the same purpose.

Figure 2:
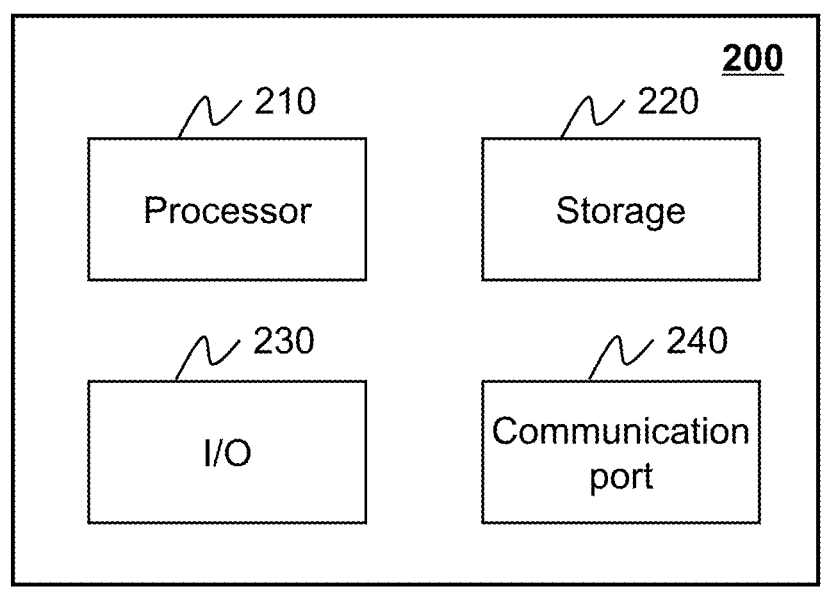
FIG. 2 is a schematic diagram illustrating hardware and/or software components of an exemplary computing device on which a processing device may be implemented according to some embodiments of the present disclosure.

The term "module," or "block," as used herein, refers to logic embodied in hardware or firmware, or to a collection of software instructions. A module or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on computing devices (e.g., the processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an Electrically Programmable Read-Only-Memory (EPROM). It will be further appreciated that hardware modules/units/blocks may be included in connected logic components, such as gates and flip-flops, and/or can be included in programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may apply to a system, an engine, or a portion thereof.

It will be understood that when a module or block is referred to as being "connected to," or "coupled to," another module, or block, it may be directly connected or coupled to, or communicate with the other module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and components for non-invasive imaging, such as for disease diagnosis or research purposes. In some embodiments, the imaging system may be a Computed Tomography (CT) system, an Emission Computed Tomography (ECT) system, a Magnetic Resonance Imaging (MRI) system, an ultrasonography system, an X-ray photography system, a Positron Emission Tomography (PET) system, a multi-modality system, or the like, or any combination thereof. Exemplary multi-modality system may include a CT-PET system, a CT-MRI system, a PET-MRI system, etc.

The following description is provided to help better understand the processing methods and/or systems. This is not intended to limit the scope the present disclosure. For persons having ordinary skills in the art, a certain amount of variations, changes, and/or modifications may be deducted under the guidance of the present disclosure. Those variations, changes, and/or modifications do not depart from the scope of the present disclosure.

The present disclosure provides systems and methods for image segmentation. An imaging system may display, on an interface of an imaging system, a 3D image including a volume of interest (VOI) such as a tumor for a user. The 3D image may include a plurality of 2D images (also referred herein as 2D image slices). The user may select a pixel in one of the plurality of 2D images as a preliminary seed point through the interface of the imaging system. The imaging system may determine a more accurate seed point based on the selected preliminary seed point. The imaging system may determine the VOI by segmenting the 3D image based on the more accurate seed point.

Figure 1:
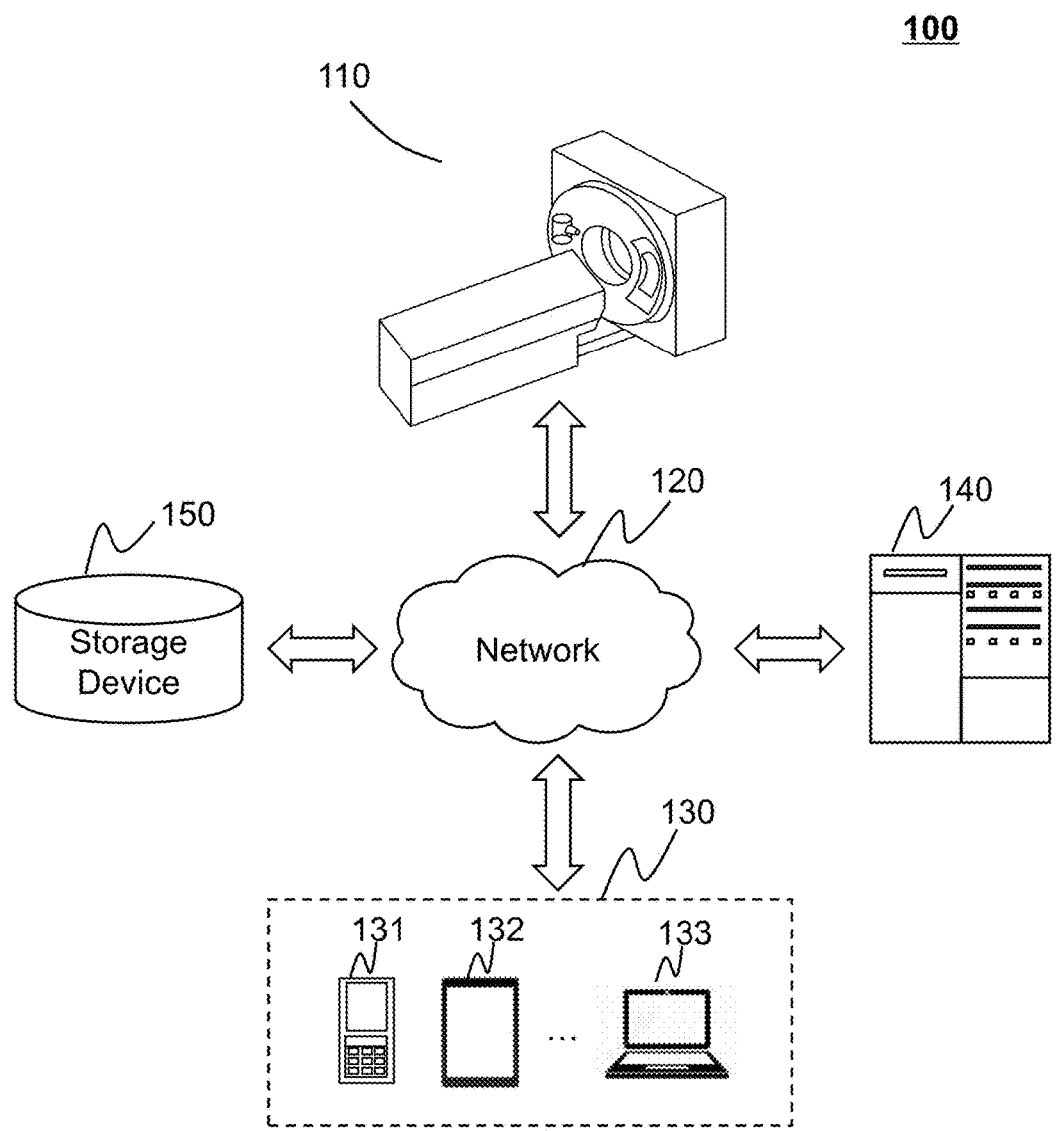
FIG. 1 is a schematic diagram of an exemplary imaging system according to some embodiments of the present disclosure.

FIG. 1 is a schematic diagram illustrating an exemplary imaging system 100 according to some embodiments of the present disclosure. As shown in FIG. 1, the imaging system 100 may include a scanner 110, a network 120, a terminal 130, a processing device 140, and a storage device 150.

The scanner 110 may scan an object and generate data for imaging. The object may be biological or non-biological. Merely by way of example, the object may include a patient, a man-made object, etc. As another example, the object may include a specific portion, organ, and/or tissue of the patient. For example, the object may include head, brain, neck, body, shoulder, arm, thorax, cardiac, stomach, blood vessel, soft tissue, knee, feet, or the like, or any combination thereof. The scanner 110 may include a CT scanner, an ECT scanner, an MRI scanner, an ultrasonography scanner, an X-ray photography scanner, a PET scanner, a multimodality scanner, or the like, or any combination thereof. Exemplary multi-modality scanner may include a CT-PET scanner, a CT-MRI scanner, a PET-MRI scanner, etc. The scanner 110 may send the data to the storage device 150, the processing device 140, or the terminal 130 via the network 120. Merely by way of example, the scanner 110 may be configured to scan an object (e.g., a patient) to obtain imaging data to generate a 3D image including a plurality of 2D images corresponding to the object.

The network 120 may include any suitable network that can facilitate the exchange of information and/or data for the imaging system 100. In some embodiments, one or more components of the imaging system 100 (e.g., the scanner 110, the terminal 130, the processing device 140, the storage device 150,) may communicate information and/or data with one or more other components of the imaging system 100 via the network 120. For example, the processing device 140 may obtain the data for imaging from the scanner 110 via the network 120. As another example, the processing device 140 may obtain user instructions from the terminal 130 via the network 120. The network 120 may be and/or include a public network (e.g., the Internet), a private network (e.g., a local area network (LAN), a wide area network (WAN)),), a wired network (e.g., an Ethernet network), a wireless network (e.g., an 802.11 network, a Wi-Fi network,), a cellular network (e.g., a Long-Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near-field communication (NFC) network, or the like, or any combination thereof. In some embodiments, the network 120 may include one or more network access points. For example, the network 120 may include wired and/or wireless network access points such as base stations and/or internet exchange points through which one or more components of the Imaging system 100 may be connected to the network 120 to exchange data and/or information. Merely by way of example, the processing device 140 may be configured to obtain a 3D image from the storage device 150 via the network 120.

The terminal 130 may include a mobile device 130-1, a tablet computer 130-2, a laptop computer 130-3, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 130 may be part of the processing device 140. Merely by way of example, the terminal 130 may be configured to display a 3D image. The terminal 130 may also be configured to transmit an instruction for scanning an object to the scanner 110. The terminal 130 may further be configured to transmit an instruction for determining a preliminary seed point to the processing device 140.

The processing device 140 may process data and/or information obtained from the scanner 110, the terminal 130, and/or the storage device 150. For example, the processing device 140 may obtain the data for imaging from the scanner 110 and/or the storage device 150. In some embodiments, the processing device 140 may be a single server or a server group. The server group may be centralized or distributed. In some embodiments, the processing device 140 may be local or remote. For example, the processing device 140 may access information and/or data stored in the scanner 110, the terminal 130, and/or the storage device 150 via the network 120. As another example, the processing device 140 may be directly connected to the scanner 110, the terminal 130 and/or the storage device 150 to access stored information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented by a computing device 200 having one or more components as illustrated in FIG. 2. Merely by way of example, the processing device 140 may be configured to determine a final seed point based on a preliminary seed point. The processing device 140 may also be configured to determine a VOI by segmenting a 3D image based on the final seed point.

The storage device 150 may store data, instructions, and/or any other information. In some embodiments, the storage device 150 may store data obtained from the terminal 130 and/or the processing device 140. In some embodiments, the storage device 150 may store data and/or instructions that the processing device 140 and/or the terminal 130 may execute or use to perform exemplary methods described in the present disclosure. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more other components of the imaging system 100 (e.g., the processing device 140, the terminal 130,). One or more components of the imaging system 100 may access the data or instructions stored in the storage device 150 via the network 120. In some embodiments, the storage device 150 may be directly connected to or communicate with one or more other components in the Imaging system 100 (e.g., the scanner 110, the processing device 140, the terminal 130,). In some embodiments, the storage device 150 may be part of the processing device 140. Merely by way of example, the storage device 150 may be configured to store a 3D image. The storage device 150 may also be configured to store instructions that the processing device 140 may execute or use to determine a final seed point based on a preliminary seed point.

FIG. 2 is a schematic diagram illustrating hardware and/or software components of an exemplary computing device on which the processing device 140 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing device 140 in accordance with techniques described herein. The computer instructions may include, for example, routines, programs, objects, components, data structures, procedures, modules, and functions, which perform particular functions described herein. For example, the processor 210 may process the data for imaging obtained from the scanner 110 and/or the storage device 150, and/or any other component of the imaging system 100. In some embodiments, the processor 210 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof. Merely by way of example, the processor 210 may be configured to determine a final seed point based on a preliminary seed point. The processor 210 may also be configured to determine a VOI by segmenting a 3D image based on the final seed point.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the scanner 110, the terminal 130, the storage device 150, and/or any other component of the Imaging system 100. In some embodiments, the storage 220 may include a mass storage, removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random-access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing device 140 for determining a volume of interest (VOI) in a three-dimensional (3D) image. Merely by way of example, the storage 220 may be configured to store a 3D image. The storage 220 may also be configured to store instructions that the processing device 140 may execute or use to determine a final seed point based on a preliminary seed point.

The I/O 230 may input and/or output signals, data, information, etc. In some embodiments, the I/O 230 may enable a user interaction with the processing device 140. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat-panel display, a curved screen, a television device, a cathode ray tube (CRT), a touch screen, or the like, or a combination thereof. Merely by way of example, the I/O 230 may be configured to receive an input for determining a preliminary seed point from a user (e.g., a doctor, an imaging engineer). The I/O 230 may also be configured to display a plurality of 2D images included in a 3D image.

The communication port 240 may be connected to a network (e.g., the network 120) to facilitate data communications. The communication port 240 may establish connections between the processing device 140 and the scanner 110, the terminal 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G,), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol. Merely by way of example, the processing device 140 may be configured to obtain a 3D image from the storage device 150 through the connection between the communication port 240 and the storage device 150.

Figure 3:
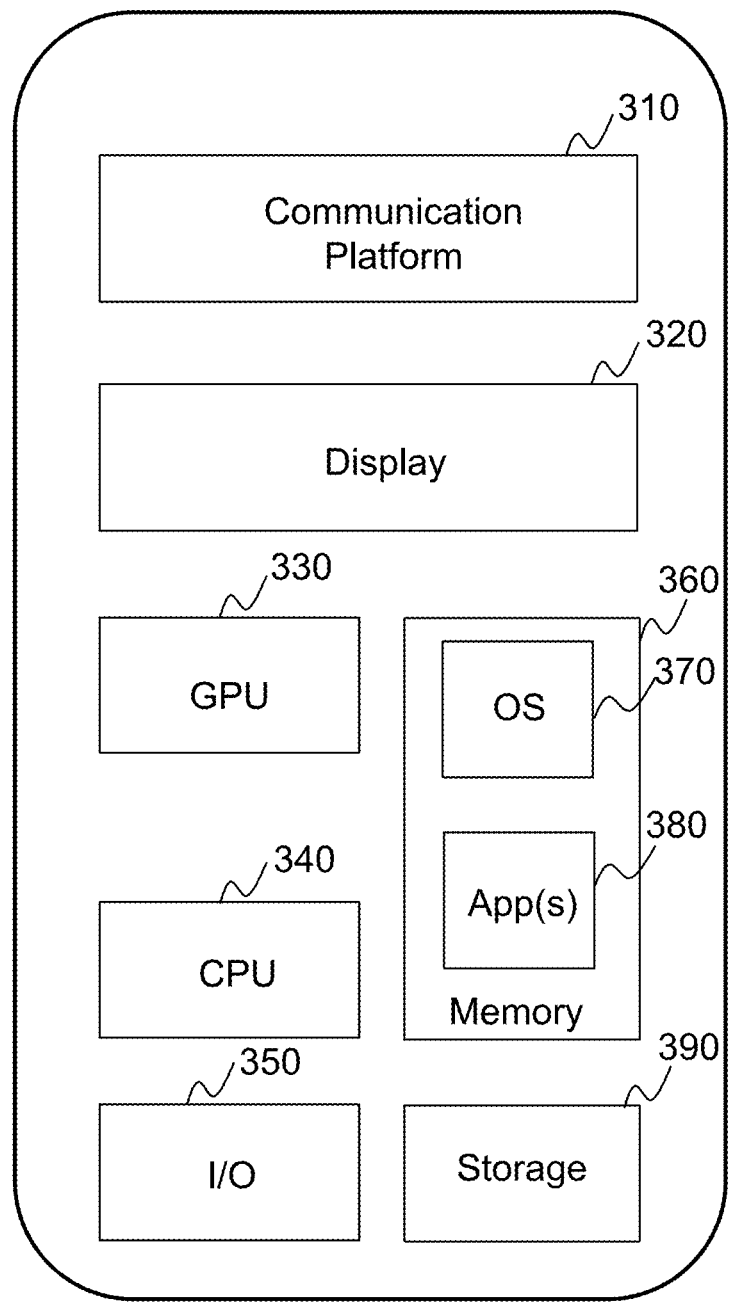
FIG. 3 is a schematic diagram illustrating hardware and/or software components of an exemplary mobile device on which one or more terminals may be implemented according to some embodiments of the present disclosure.

FIG. 3 is a schematic diagram illustrating hardware and/or software components of an exemplary mobile device on which a terminal may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™,) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the Imaging system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
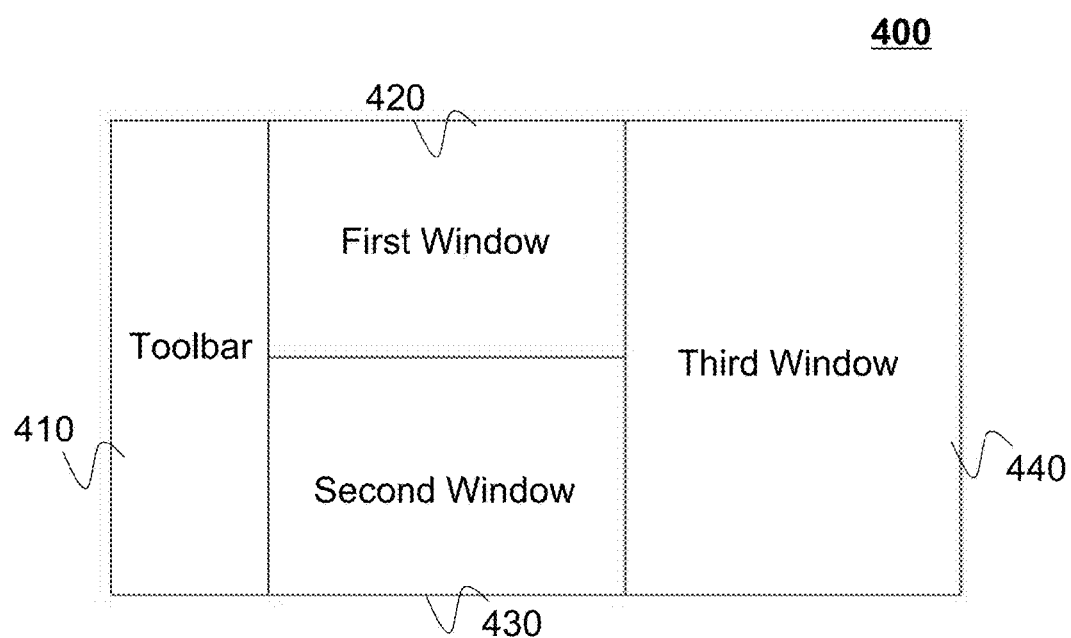
FIG. 4 is a schematic diagram illustrating an exemplary display interface according to some embodiments of the present disclosure.

FIG. 4 is a schematic diagram illustrating an exemplary display interface according to some embodiments of the present disclosure. The display interface 400 may be included in the processing device 140 and/or the terminal 130. The display interface 400 may be implemented on the I/O 230 illustrated in FIG. 2 and/or the display 320 illustrated in FIG. 3.

The display interface 400 may include a toolbar 410 and a display area. In some embodiments, the display area may include one or more windows (e.g., a first window 420, a second window 430, and a third window 440) to display different images at the same time. The image may include a two-dimensional (2D) image and/or a three-dimensional (3D) image. The image may include a CT image, a PET image, a Magnetic Resonance (MR) image, an ultrasonography image, an X-ray image, a multimodality image, or the like, or any combination thereof. Exemplary multi-modality image may include a CT-PET image, a CT-MR image, a PET-MR image, etc.

In some embodiments, the display area may display images relating to different modalities in different windows. For example, the first window 420 may display a CT image of the brain, the second window 430 may display an MR image of the brain, and the third window 440 may display a PET image of the brain. In some embodiments, the display area may display images relating to different objects in different windows. For example, the first window 420 may display a 3D image of the brain, the second window 430 may display a 3D image of the lung, and the third window 440 may display a 3D image of the liver. In some embodiments, the display area may display images of different sections (e.g., the axial plane, the coronal plane, the sagittal plane, the slope plane, the curved plane,) of an object in different windows. For example, the first window 420 may display a plurality of axial-plane 2D images (also referred to as 2D image slices) included in a 3D image of brain, the second window 430 may display a plurality of coronal-plane 2D images included in the 3D image of brain, and the third window 440 may display a plurality of sagittal-plane 2D images included in the 3D image of brain. The plurality of 2D images included in a 3D image may be arranged in a spatial order.

The axial plane refers to an anatomical plane that is parallel to the ground and divides a body into an upper part and a lower part when the body is upright on the ground. The sagittal plane refers to an anatomical plane that is vertical to the ground and divides a body into a right part and a left part when the body is upright on the ground. The coronal plane refers to an anatomical plane that is vertical to the ground and divides a body into a front part and a back part when the body is upright on the ground. In some embodiments, the processing device 140 may generate an axial-plane image of an object based on data for imaging generated by the scanner 110. The processing device 140 may generate images of other sections (e.g., the coronal plane, the sagittal plane, the slope plane, the curved plane,) of the object by data reconstruction. The data reconstruction may include multi-planar reconstruction (MPR) and curved planar reconstruction (CPR).

In some embodiments, a user (e.g., a doctor, an imaging engineer) may input instructions relating to process images displayed on the display interface 400 via the toolbar 410. For example, the user may determine which 2D image included in a 3D image to be displayed on the display interface 400 via the toolbar 410. As another example, the user may crop, rotate, enlarge or shrink an image displayed in the display area via the toolbar 410.

Figure 5:
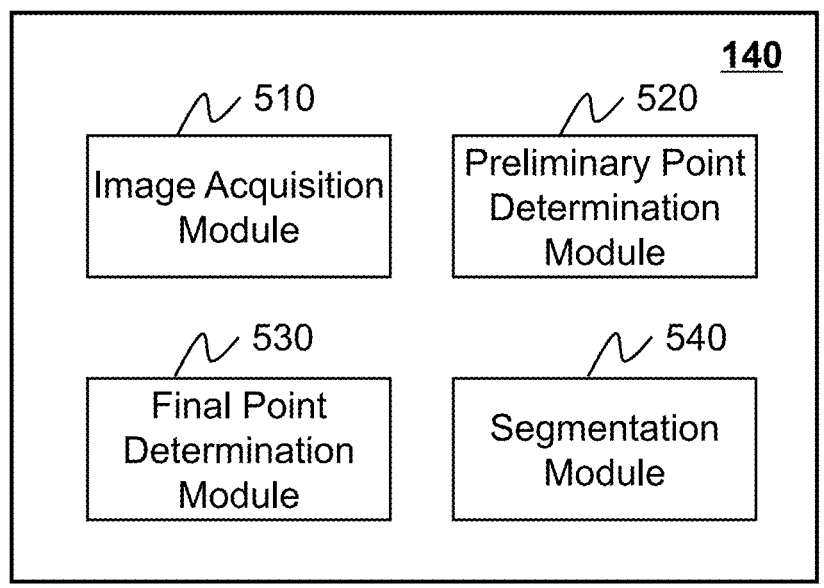
FIG. 5 is a schematic block diagram illustrating an exemplary processing device according to some embodiments of the present disclosure.

FIG. 5 is a schematic diagram illustrating an exemplary processing device according to some embodiments of the present disclosure. As illustrated in FIG. 5, the processing device 140 may include an image acquisition module 510, a preliminary point determination module 520, a final point determination module 530, and a segmentation module 540.

Figure 7:
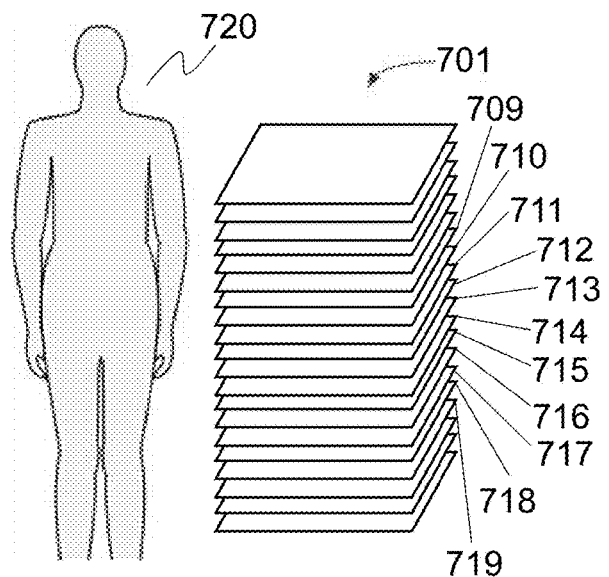
FIG. 7 is a schematic diagram illustrating a plurality of exemplary 2D images included in a 3D image according to some embodiments of the present disclosure.

The image acquisition module 510 may acquire a 3D image. The 3D image may include a number of 2D images (also referred herein as 2D image slices) arranged in a spatial order from the storage medium (e.g., the storage device 150, the storage 220) and/or the terminal 130. The number of (the quantity of) 2D images (or 2D image slices) is also referred herein as the slice count of the 2D images. The 3D image may include an MR image, a CT image, a PET image, an X-ray image, or the like, or any combination thereof. The plurality of 2D images may include different sections (e.g., the axial plane, the coronal plane, the sagittal plane, the slope plane, the curved plane) of the object (e.g., a patient). For example, as shown in FIG. 7, a 3D image 701 relating to a body 720 may include a plurality of 2D axial-plane images (e.g., images 709-719). The plurality of 2D axial-plane images (e.g., images 709-719 illustrated in FIG. 7) may be arranged in a spatial order. The 3D image may include a volume of interest (VOI) (e.g., a tumor) associated with the object. There may be a region of interest (ROI) corresponding to the VOI in at least one of the plurality of 2D images.

The preliminary point determination module 520 may determine a preliminary seed point in a first 2D image of the plurality of 2D images. The first 2D image may include a first ROI corresponding to the VOI. In some embodiments, the preliminary seed point may be a pixel inside the first ROI or a pixel outside the first ROI.

The final point determination module 530 may determine a final seed point in a second 2D image of the plurality of 2D images based on the preliminary seed point. The final seed point may be used to determine the VOI in the 3D image. The first 2D image and the second 2D image may be same or different. The second 2D image may include a second ROI corresponding to the VOI. The final seed point may be a pixel inside the second ROI or a pixel outside the second ROI.

The segmentation module 540 may determine the VOI in the 3D image based on the final seed point and a segmentation technique. The segmentation technique may include a region-growing algorithm, a morphology-based algorithm, a matched-filtering algorithm, a level-set algorithm, a tracking algorithm, or the like, or any combination thereof. In some embodiments, the segmentation module 540 may perform the segmentation technique on the 3D image to determine the VOI in the 3D image. In some embodiments, the segmentation module 540 may perform the segmentation technique on one or more 2D images of the plurality of 2D images included in the 3D image to determine one or more ROIs corresponding to the VOI in the one or more 2D images of the plurality of 2D images based on the final seed point. The segmentation module 540 may determine the VOI based on the one or more ROIs.

The modules in the processing device 140 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee, a Near Field Communication (NFC), an infrared connection, or the like, or any combination thereof. Two or more of the modules may be combined into a single module, and any one of the modules may be divided into two or more units. For example, the segmentation module 540 may be divided into two units. A first unit may determine the VOI based on the 3D image. A second unit may determine the VOI based on one or more 2D images included in the 3D image.

It should be noted that the processing device 140 described above is provided for illustration, not intended to limit the scope of the present disclosure. For persons having ordinary skills in the art, multiple variations and modifications may be reduced to practice in the light of the present disclosure. However, those variations and modifications do not depart from the scope of the present disclosure. For example, the processing device 140 may further include a storage module (not shown in FIG. 5). The storage module may be configured to store data generated during any process performed by any component of in the processing device 140. As another example, each of components of the processing device 140 may associate with a storage module. Additionally or alternatively, the components of the computing device 120 may share a common storage module.

Figure 6:
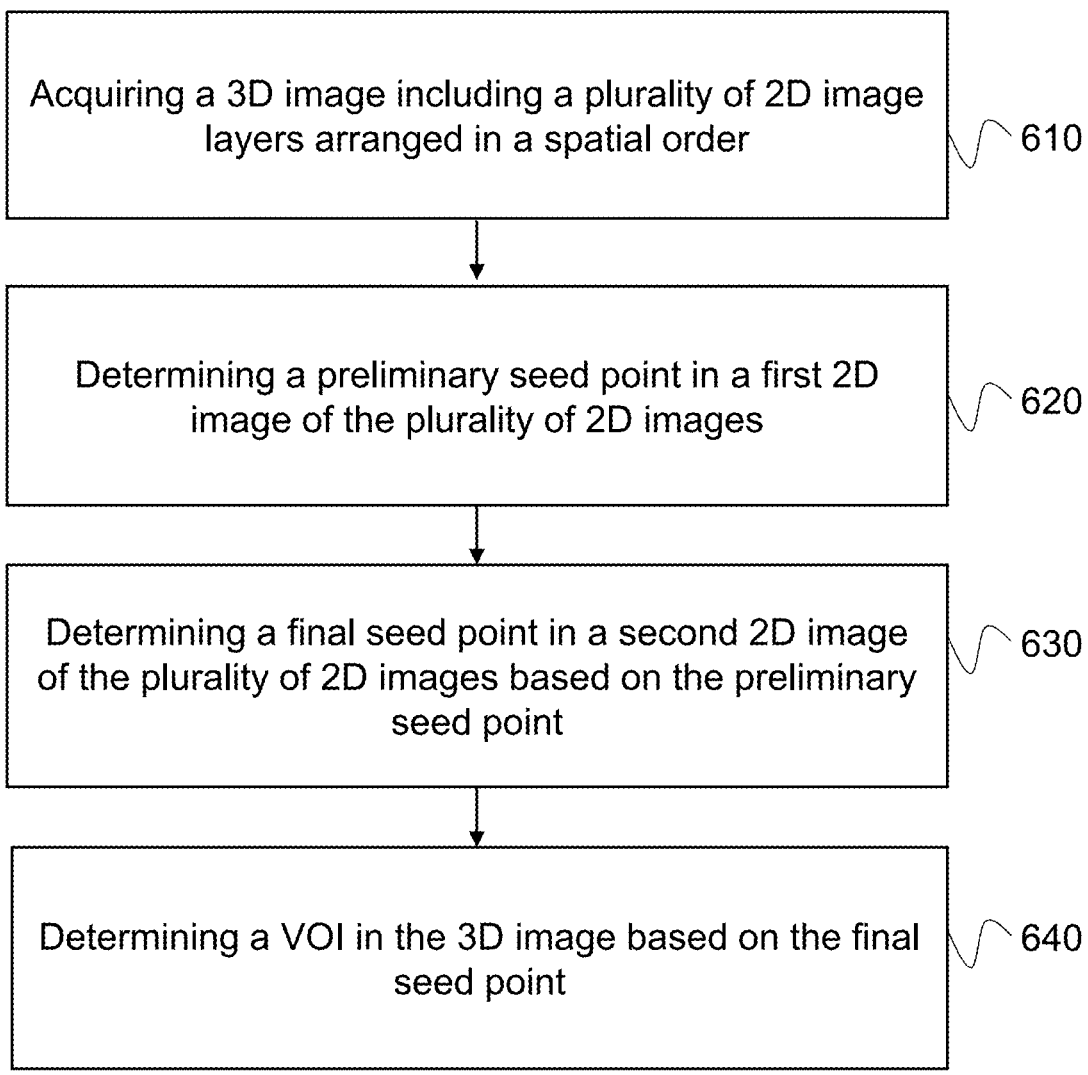
FIG. 6 is a flowchart illustrating an exemplary process for determining a VOI in a 3D image according to some embodiments of the present disclosure.

FIG. 6 is a flowchart illustrating an exemplary process for determining a volume of interest (VOI) in a 3D image according to some embodiments of the present disclosure. The process 600 may be implemented in the imaging system 100 illustrated in FIG. 1. For example, the process 600 may be stored in the storage device 150 and/or the storage 220 as a form of instructions (e.g., an application), and invoked and/or executed by the processing device 140 (e.g., the processor 210 illustrated in FIG. 2, or one or more modules in the processing device 140 illustrated in FIG. 5). The operations of the illustrated process presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

Figure 8:
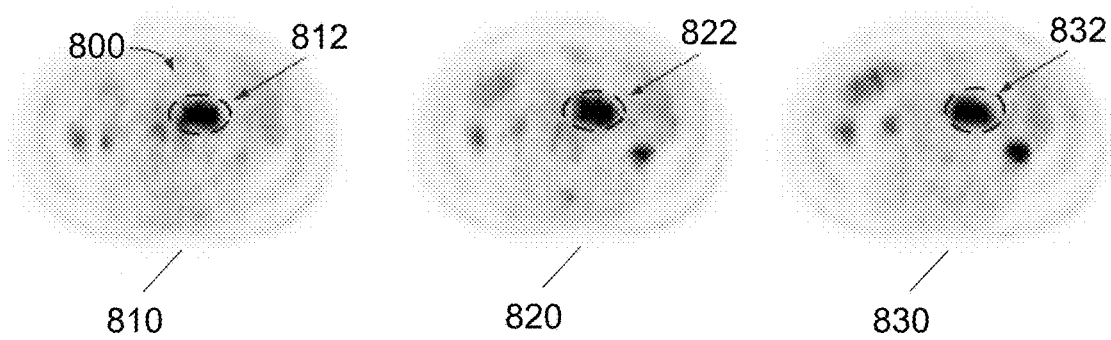
FIG. 8 is a schematic diagram illustrating three exemplary ROIs according to some embodiments of the present disclosure.

In 610, the image acquisition module 510 may acquire a 3D image. The 3D image may include a plurality of 2D images arranged in a spatial order. The 3D image may include an MR image, a CT image, a PET image, an X-ray image, or the like, or any combination thereof. The plurality of 2D images may include different sections (e.g., the axial plane, the coronal plane, the sagittal plane, the slope plane, the curved plane) of the object. For example, as shown in FIG. 7, a 3D image 701 relating to a body 720 may include a plurality of 2D axial-plane images (e.g., images 709-719). The plurality of 2D axial-plane images (e.g., images 709-719 illustrated in FIG. 7) may be arranged in a spatial order. The 3D image may include a volume of interest (VOI) (e.g., a tumor) associated with the object. There may be a region of interest (ROI) corresponding to the VOI in at least one of the plurality of 2D images. For example, as shown in FIG. 8, images 810, 820, and 830 may be three 2D images included in a 3D image. An ROI 812 in the image 810 may correspond to a VOI 800 (e.g., a tumor). An ROI 822 in the image 820 may correspond to the VOI 800. An ROI 832 in the image 830 may correspond to the VOI 800. In some embodiments, the image acquisition module 510 may acquire the 3D image including the plurality of 2D images from the storage medium (e.g., the storage device 150, the storage 220) and/or the terminal 130.

In 620, the preliminary point determination module 520 may determine a preliminary seed point in a first 2D image of the plurality of 2D images. The first 2D image may include a first ROI corresponding to the VOI. In some embodiments, the preliminary seed point may be a pixel inside the first ROI or a pixel outside the first ROI. The preliminary seed point may be determined by the preliminary point determination module 520 according to the input by a user (e.g., a doctor, an imaging engineer). For example, the user may select the first 2D image from the plurality of 2D images and a point (e.g., a pixel in the first 2D image) through the display interface 400 illustrated in FIG. 4. The selected point by the user may be designated by the preliminary point determination module 520 as the preliminary seed point in the first 2D image. Alternatively or additionally, the preliminary seed point may be automatically by the preliminary point determination module 520. For example, the preliminary point determination module 520 may automatically determine the first 2D image including an ROI associated with the VOI. The preliminary point determination module 520 may determine a plurality of gray values of pixels in the first 2D image. The preliminary point determination module 520 may also select a pixel with a minimum gray value if a preliminary seed point outside the ROI is needed. Alternatively, the preliminary point determination module 520 may select a pixel with a maximum gray value if a preliminary seed point inside the ROI is needed.

In 630, the final point determination module 530 may determine a final seed point in a second 2D image of the plurality of 2D images based on the preliminary seed point. The final seed point may be used to determine the VOI in the 3D image. The first 2D image and the second 2D image may be the same or different. The second 2D image may include a second ROI corresponding to the VOI. The final seed point may be a pixel in the second ROI or a pixel outside the second ROI. In some embodiments, the final point determination module 530 may determine a preliminary VOI based on the preliminary seed point. The final point determination module 530 may also determine the final seed point based on the preliminary VOI (e.g., as described elsewhere in this disclosure in connection with FIG. 9 and/or FIG. 10). In some embodiments, the final point determination module 530 may determine the final seed point based on gray values of pixels in the first 2D image (e.g., as described elsewhere in this disclosure in connection with FIG. 11 and/or FIG. 12). In some embodiments, the final point determination module 530 may determine the final seed point based on a gray value distribution diagram (e.g., as described elsewhere in this disclosure in connection with FIG. 13). The gray value distribution diagram may include a gray histogram. The gray value distribution diagram may indicate the number of pixels or voxels with a gray value.

Figure 15:
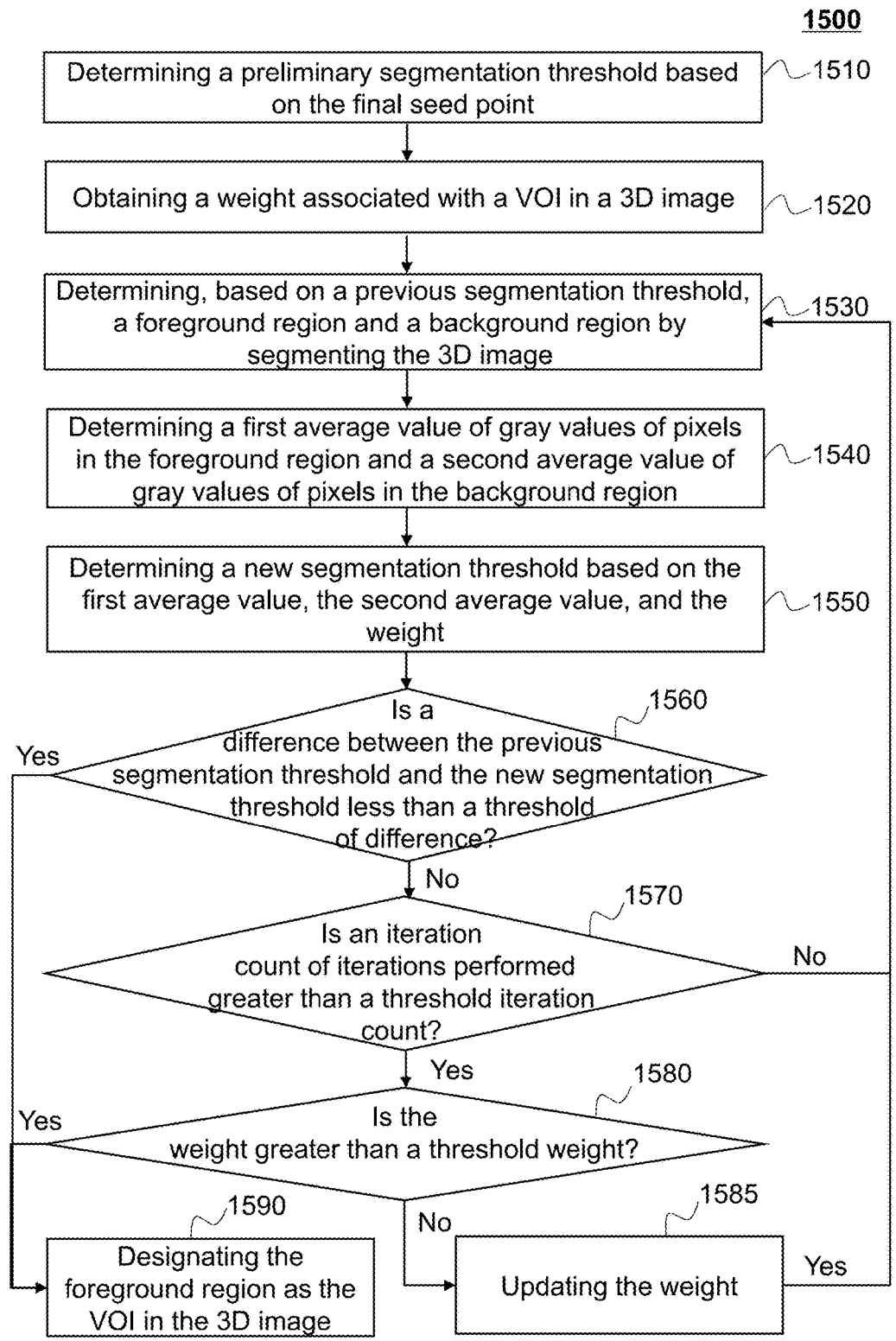
FIG. 15 is a flowchart illustrating an exemplary process for determining a VOI in a 3D image based on a final seed point according to some embodiments of the present disclosure.

In 640, the segmentation module 540 may determine the VOI in the 3D image based on the final seed point and a segmentation technique (e.g., as described elsewhere in this disclosure in connection with FIG. 15). The segmentation technique may include a region-growing algorithm, a morphology-based algorithm, a matched-filtering algorithm, a level-set algorithm, a tracking algorithm, or the like, or any combination thereof.

In some embodiments, the segmentation module 540 may perform the segmentation technique on the 3D image to determine the VOI in the 3D image. In some embodiments, the segmentation module 540 may perform the segmentation technique on one or more 2D images of the 2D images included in the 3D image to determine one or more ROIs corresponding to the VOI in the one or more 2D images of the 2D images based on the final seed point. For example, the segmentation module 540 may perform the segmentation technique on the second 2D image to determine the second ROI based on the final seed point. As another example, the segmentation module 540 may perform the segmentation technique on the 2D images that do not include the final seed point. The segmentation module 540 may also determine, based on pixels corresponding to the final seed point, one or more ROIs corresponding to the VOI in the 2D images that do not include the final seed point. A pixel corresponding to the final seed point in a 2D image that does not include the final seed point may be an orthographic projection of the final seed point onto the 2D image. The segmentation module 540 may determine the VOI based on the one or more ROIs.

It should be noted that the above description of the flowchart 600 is merely provided for illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional steps (e.g., a storing step) may be added elsewhere in process 600.

Figure 9:
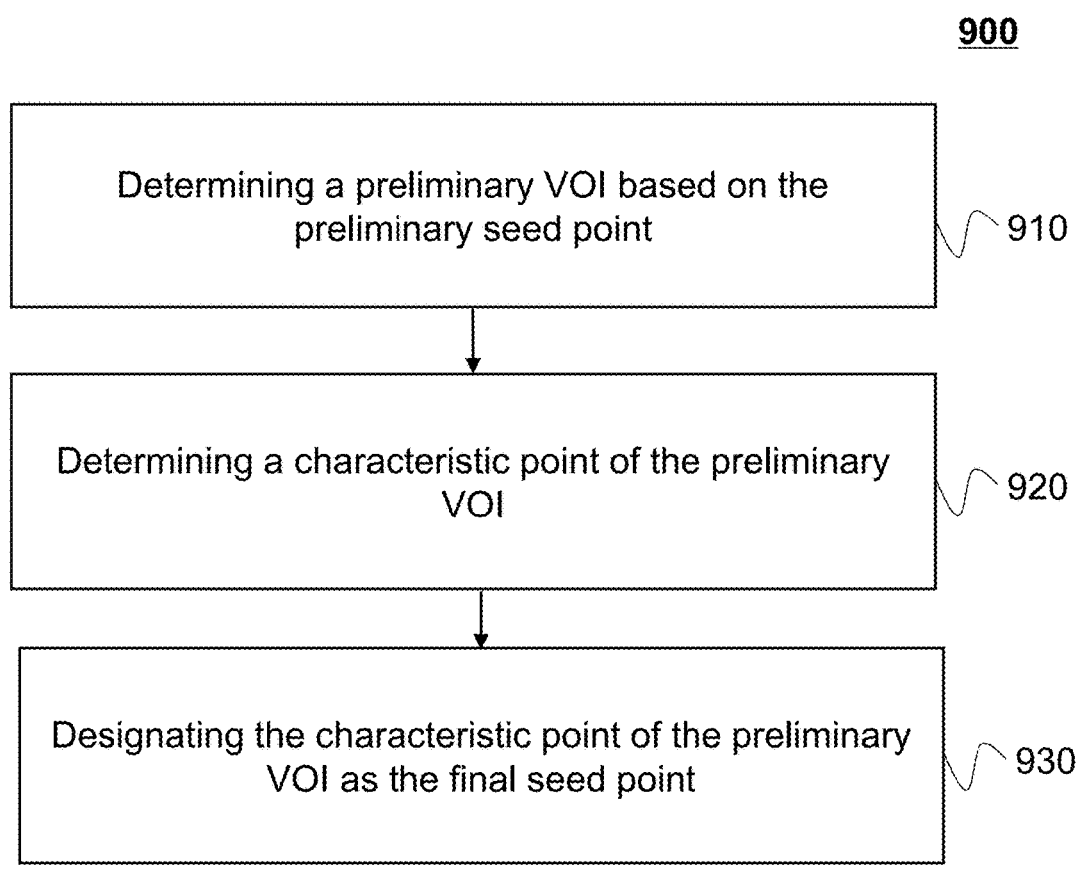
FIG. 9 is a flowchart illustrating an exemplary process for determining a final seed point according to some embodiments of the present disclosure.

FIG. 9 is a flowchart illustrating an exemplary process for determining a final seed point according to some embodiments of the present disclosure. Process 900 may be implemented in the imaging system 100 illustrated in FIG. 1. For example, process 900 may be stored in the storage device 150 and/or the storage 220 as a form of instructions (e.g., an application), and invoked and/or executed by the processing device 140 (e.g., the processor 210 illustrated in FIG. 2, or one or more modules in the processing device 140 illustrated in FIG. 5). The operations of the illustrated process presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting. In some embodiments, step 630 of process 600 illustrated in FIG. 6 may be performed according to process 900.

In 910, the final point determination module 530 may determine a preliminary VOI based on the preliminary seed point and a segmentation technique. The operation for determining the preliminary VOI based on the preliminary seed point may be same as the determination of the VOI based on the final seed point described in step 640 of process 600.

The segmentation technique may include a region-growing algorithm, a morphology-based algorithm, a matched-filtering algorithm, a level-set algorithm, a tracking algorithm, or the like, or any combination thereof. In some embodiments, the final point determination module 530 may perform the segmentation technique in the 3D image to determine the preliminary VOI in the 3D image. In some embodiments, the final point determination module 530 may perform the segmentation technique in one or more 2D images of the plurality of 2D images included in the 3D image to determine one or more preliminary ROIs in the one or more 2D images based on the preliminary seed point. For example, the final point determination module 530 may perform the segmentation technique in the first 2D image to determine a preliminary ROI based on the preliminary seed point. As another example, the final point determination module 530 may perform the segmentation technique on 2D images that do not include the preliminary seed point. The final point determination module 530 may also determine preliminary ROIs based on pixels corresponding to the preliminary seed point. A pixel corresponding to the preliminary pixel in a 2D image that does not include the preliminary seed point may be an orthographic projection of the preliminary seed point onto the 2D image. The final point determination module 530 may determine the preliminary VOI based on the one or more preliminary ROIs.

In 920, the final point determination module 530 may determine a characteristic point of the preliminary VOI. The characteristic point of the preliminary VOI may be a geometric center of the preliminary VOI or a center of gravity of the preliminary VOI.

In 930, the final point determination module 530 may designate the characteristic point of the preliminary VOI as the final seed point.

It should be noted that the above description of the flowchart 900 is merely provided for illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional steps (e.g., a storing step) may be added elsewhere in process 900.

Figure 10:
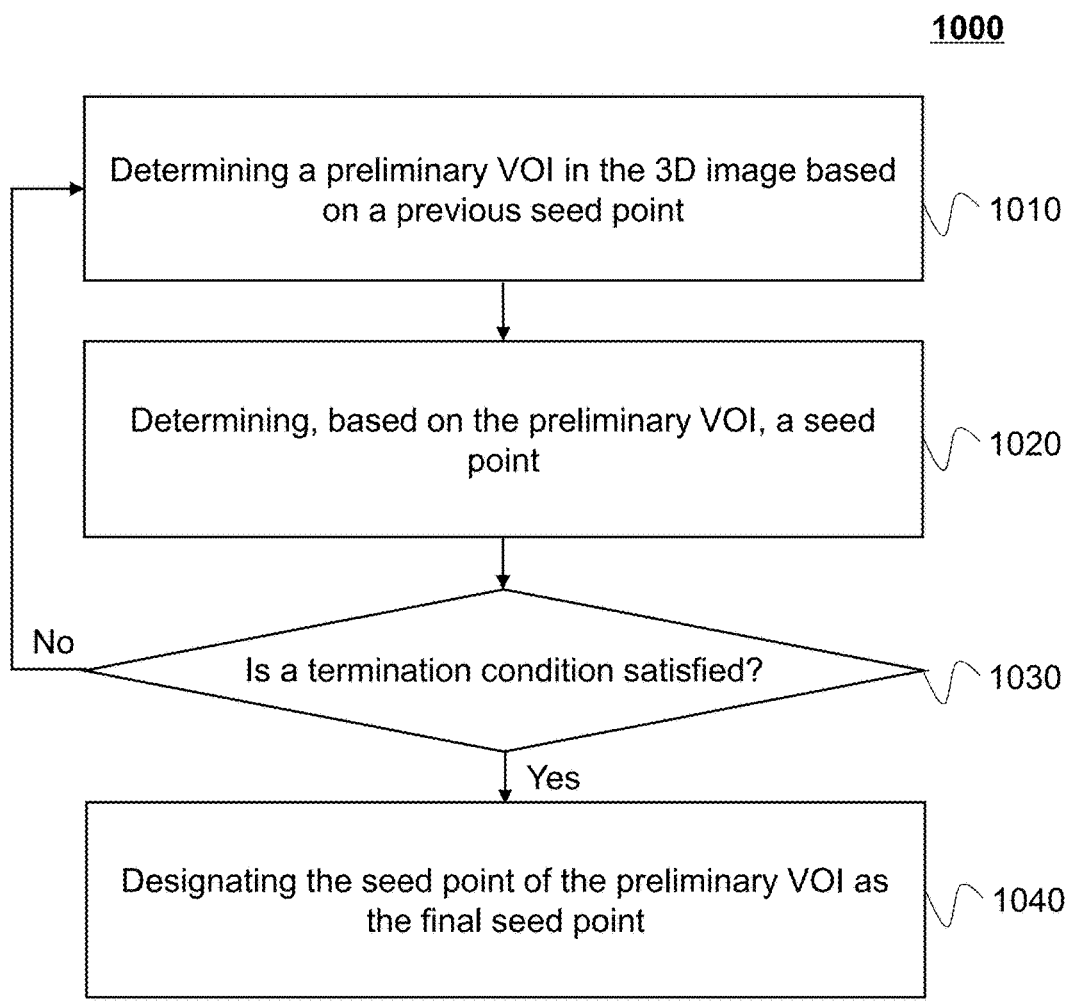
FIG. 10 is a flowchart illustrating an exemplary process for determining a final seed point according to some embodiments of the present disclosure.

FIG. 10 is a flowchart illustrating an exemplary process for determining a final seed point according to some embodiments of the present disclosure. Process 1000 may be implemented in the imaging system 100 illustrated in FIG. 1. For example, the process 1000 may be stored in the storage device 150 and/or the storage 220 as a form of instructions (e.g., an application), and invoked and/or executed by the processing device 140 (e.g., the processor 210 illustrated in FIG. 2, or one or more modules in the processing device 140 illustrated in FIG. 5). The operations of the illustrated process presented below are intended to be illustrative. In some embodiments, process 1000 may be accomplished with one or more additional operations not described, and/or without one or more of the operations discussed. Additionally, the order in which the operations of the process 1000 as illustrated in FIG. 10 and described below is not intended to be limiting. In some embodiments, step 630 of process 600 illustrated in FIG. 6 may be performed according to process 1000.

Process 900 may initiate an iteration process for determining the final seed point based on the preliminary seed point. The iteration process may include a plurality of iterations (e.g., steps 1010-1030).

In 1010, the final point determination module 530 may determine a preliminary VOI in the 3D image based on a previous seed point and a segmentation technique. The previous seed point may be the preliminary seed point in a first iteration of the plurality of iterations or a seed point determined in a previous iteration. The determination of the preliminary VOI may be similar to step 910 of process 900 and/or the description of step 640 of process 600.

The segmentation technique may include a region-growing algorithm, a morphology-based algorithm, a matched-filtering algorithm, a level-set algorithm, a tracking algorithm, or the like, or any combination thereof.

In some embodiments, the final point determination module 530 may perform the segmentation technique on the 3D image to determine the preliminary VOI in the 3D image. In some embodiments, the final point determination module 530 may perform the segmentation technique on one or more 2D images of the plurality of 2D images included in the 3D image to determine one or more preliminary ROIs in the one or more 2D images of the plurality of 2D images based on the previous seed point. For example, the final point determination module 530 may perform the segmentation technique on a 2D image including the previous seed point to determine a preliminary ROI based on the previous seed point. As another example, the final point determination module 530 may perform the segmentation technique on the 2D images that do not include the previous seed point. The final point determination module 530 may determine preliminary ROIs based on pixels corresponding to the previous seed point. A pixel corresponding to the previous seed point in a 2D image that does not include the previous seed point may be an orthographic projection of the previous seed point onto the 2D image. The final point determination module 530 may determine the preliminary VOI based on the one or more preliminary ROIs.

In 1020, the final point determination module 530 may determine a seed point based on the preliminary VOI. The seed point may be a characteristic point of the preliminary VOI. The characteristic point of the preliminary VOI may be a geometric center of the preliminary VOI or a center of gravity of the preliminary VOI.

In 1030, the final point determination module 530 may determine whether a termination condition is satisfied. In response to a determination that the termination condition is satisfied, the final point determination module 530 may terminate the iteration process, and process 1000 may proceed to 1040. The final point determination module 530 may also designate the seed point determined in the last iteration as the final seed point. In response to a determination that the termination condition is not satisfied, the final point determination module 530 may initiate a new iteration, and process 1000 may proceed to 1010.

In some embodiments, the termination condition may relate to the number of the iterations that have been performed. For example, the final point determination module 530 may determine the number of iterations that have been performed. The processing device 140 may also determine whether the number of iterations that have been performed is less than a threshold (e.g., 10 iterations). In response to a determination that the number of iterations that have been performed is less than the threshold, the final point determination module 530 may initiate a new iteration, and process 1000 may proceed to 1010. In response to a determination that the number of iterations that have been performed is equal to or greater than the threshold, the final point determination module 530 may terminate the iteration process, and process 1000 may proceed to 1040. The final point determination module 530 may also designate the seed point determined in the last iteration as the final seed point.

Alternatively or additionally, the termination condition may be relating to the input from the user. For example, in an iteration, the final point determination module 530 may display the seed point determined in the iteration (e.g., the seed point determined in 1020 in the iteration) to the user through, for example, the display interface 400. The user may enter an input related to the seed point determined in the iteration to the final point determination module 530. For example, if the user is satisfied with the seed point, the user may press a button related to terminating the iteration process, and the final point determination module 530 may, based on the user input received, terminate the iteration process and designate the seed point determined in the last iteration as the final seed point. If the user is not satisfied with the seed point, the user may press a button related to initiating a new iteration, and the final point determination module 530 may initiate a new iteration according to the user input.

It should be noted that the above description of the flowchart 1000 is merely provided for illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional steps (e.g., a storing step) may be added elsewhere in process 1000.

Figure 11:
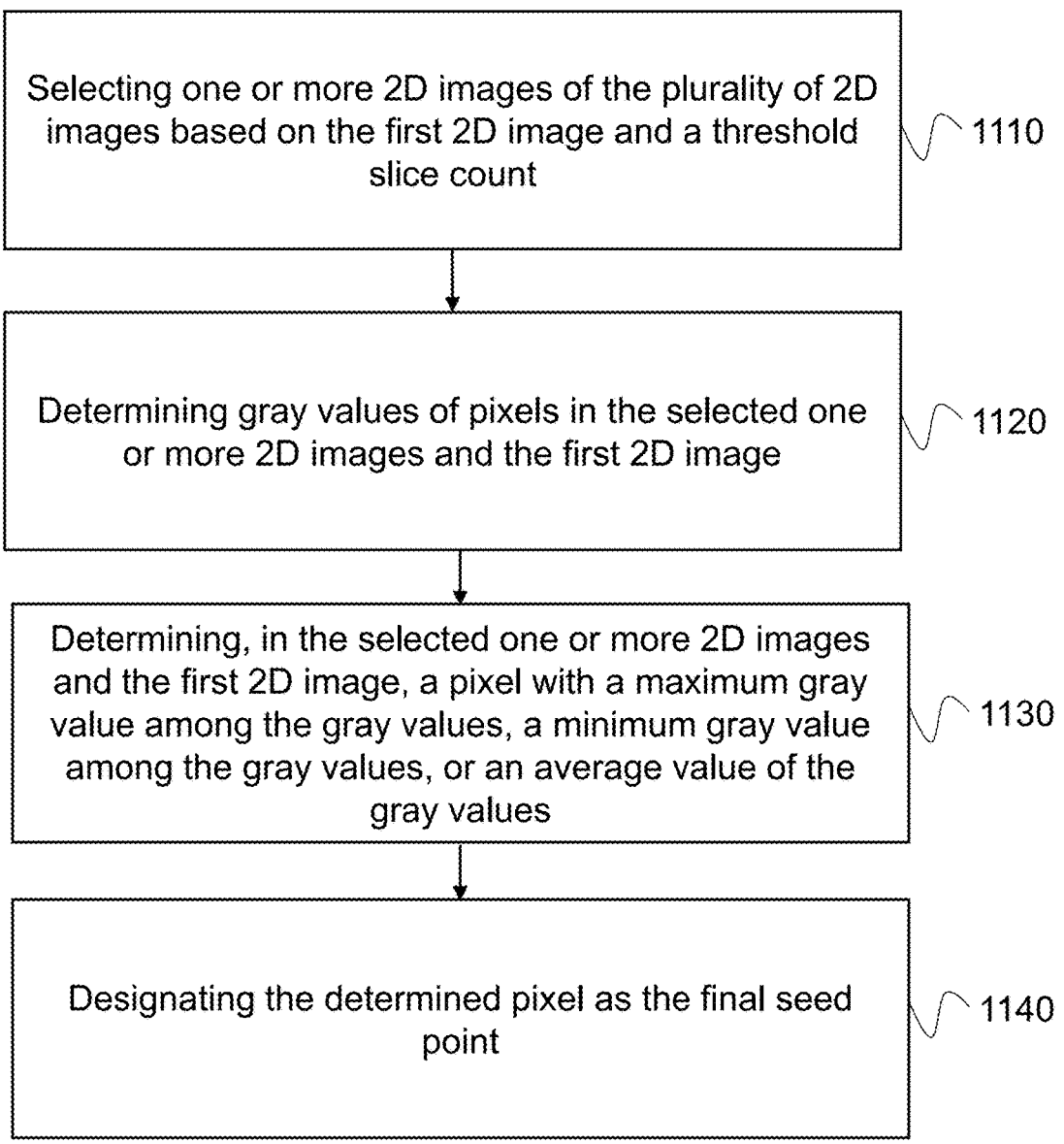
FIG. 11 is a flowchart illustrating an exemplary process for determining a final seed point according to some embodiments of the present disclosure.

FIG. 11 is a flowchart illustrating an exemplary process for determining a final seed point according to some embodiments of the present disclosure. The process 1100 may be implemented in the imaging system 100 illustrated in FIG. 1. For example, the process 1100 may be stored in the storage device 150 and/or the storage 220 as a form of instructions (e.g., an application), and invoked and/or executed by the processing device 140 (e.g., the processor 210 illustrated in FIG. 2, or one or more modules in the processing device 140 illustrated in FIG. 5). The operations of the illustrated process presented below are intended to be illustrative. In some embodiments, the process 1100 may be accomplished with one or more additional operations not described, and/or without one or more of the operations discussed. Additionally, the order in which the operations of the process 1100 as illustrated in FIG. 11 and described below is not intended to be limiting. In some embodiments, step 630 of process 600 illustrated in FIG. 6 may be performed according to process 1100.

In 1110, the final point determination module 530 may select one or more 2D images of the plurality of 2D images based on the first 2D image and a threshold slice count. The plurality of 2D images may be arranged in a spatial order (e.g., as described elsewhere in this disclosure in connection with FIG. 7). The final point determination module 530 may select one or more 2D images close to the first 2D image. In some embodiments, the selected one or more 2D images are within a certain number of image slice(s) (or referred to herein as the threshold slice count) away from the first 2D image. For example, as shown in FIG. 7, the first 2D image may be image 714, and the threshold slice count may be 2. The final point determination module 530 may select one or more 2D images from images 711, 712, 713, 715, 716, and 717, which fall within the range of 2 image slices away from the first 2D image (i.e., image 714). In some embodiments, the final point determination module 530 may select one or more 2D images from the images that fall within the range of twice (or multiple times) of the threshold slice count away from the first 2D image. For example, as shown in FIG. 7, the first 2D image may be image 714, and the threshold slice count may be 2. The final point determination module 530 may select at least one of images 709, 710, 711, 712, 713, 715, 716, 717, 718, and 719, which fall within the range of 4 image slices away from the first 2D image (i.e., image 714).

In 1120, the final point determination module 530 may determine gray values of pixels in the selected one or more 2D images and the first 2D image.

In 1130, the final point determination module 530 may determine, in the selected one or more 2D images and the first 2D image, a pixel having one of: a maximum gray value among the gray values, a minimum gray value among the gray values, and an average value of the gray values. For example, the final point determination module 530 may select a pixel with a maximum gray value if a final seed point in the ROI corresponding to the VOI is needed. As another example, the final point determination module 530 may select a pixel with a minimum gray value if a final seed point outside the ROI corresponding to the VOI is needed.

In 1140, the final point determination module 530 may designate the determined pixel as the final seed point.

It should be noted that the above description of the flowchart 1100 is merely provided for illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional steps (e.g., a storing step) may be added elsewhere in process 1100.

Figure 12:
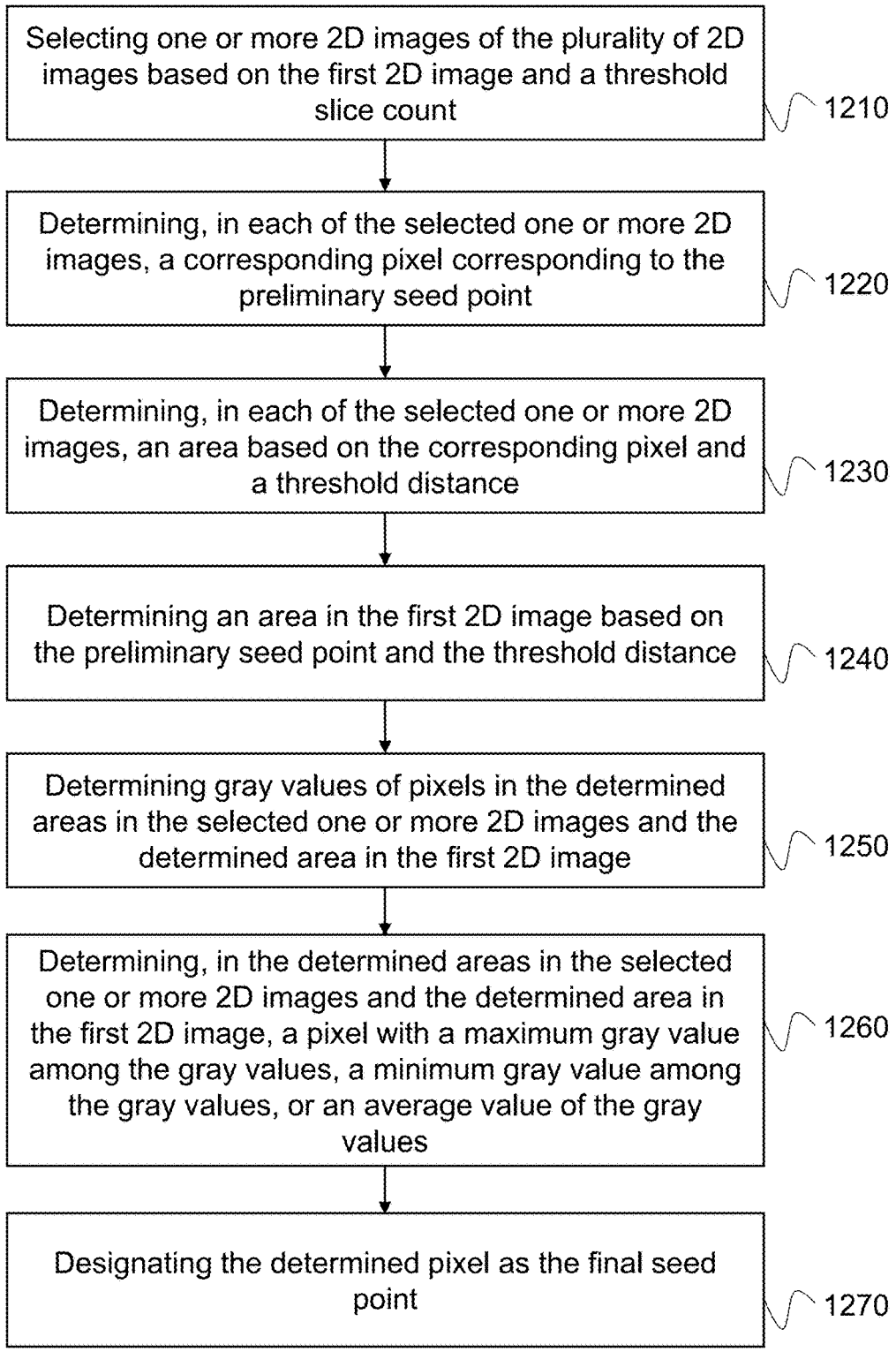
FIG. 12 is a flowchart illustrating an exemplary process for determining a final seed point according to some embodiments of the present disclosure.

FIG. 12 is a flowchart illustrating an exemplary process for determining a final seed point according to some embodiments of the present disclosure. The process 1200 may be implemented in the imaging system 100 illustrated in FIG. 1. For example, the process 1200 may be stored in the storage device 150 and/or the storage 220 as a form of instructions (e.g., an application), and invoked and/or executed by the processing device 140 (e.g., the processor 210 illustrated in FIG. 2, or one or more modules in the processing device 140 illustrated in FIG. 5). The operations of the illustrated process presented below are intended to be illustrative. In some embodiments, the process 1200 may be accomplished with one or more additional operations not described, and/or without one or more of the operations discussed. Additionally, the order in which the operations of the process 1200 as illustrated in FIG. 12 and described below is not intended to be limiting. In some embodiments, step 630 of process 600 illustrated in FIG. 6 may be performed according to process 1200.

In 1210, the final point determination module 530 may select one or more 2D images of the plurality of 2D images based on the first 2D image and a threshold slice count. The plurality of 2D images may be arranged in a spatial order (e.g., as described elsewhere in this disclosure in connection with FIG. 7). The final point determination module 530 may select one or more 2D images close to the first 2D image. In some embodiments, the selected one or more 2D images are within a certain number of image slice(s) (or referred to herein as the threshold slice count) away from the first 2D image. For example, as shown in FIG. 7, the first 2D image may be image 714, and the threshold slice count may be 2. The final point determination module 530 may select one or more 2D images from images 711, 712, 713, 715, 716, and 717, which fall within the range of 2 image slices away from the first 2D image (i.e., image 714). In some embodiments, the final point determination module 530 may select one or more 2D images from the images that fall within the range of twice (or multiple times) of the threshold slice count away from the first 2D image. For example, as shown in FIG. 7, the first 2D image may be image 714, and the threshold slice count may be 2. The final point determination module 530 may select at least one of images 709, 710, 711, 712, 713, 715, 716, 717, 718, and 719, which fall within the range of 4 image slices away from the first 2D image (i.e., image 714).

In 1220, the final point determination module 530 may determine, in each of the selected one or more 2D images, a corresponding pixel corresponding to the preliminary seed point. The corresponding pixel corresponding to the preliminary seed point in a 2D image that does not include the preliminary seed point may be an orthographic projection of the preliminary seed point onto the 2D image.

In 1230, the final point determination module 530 may determine, in each of the selected one or more 2D images, an area based on the corresponding pixel and a threshold distance. For example, the final point determination module 530 may determine an area including the pixels that are within a threshold distance from the corresponding pixel.

In some embodiments, the threshold distance may be a Euclidean distance. For example, the threshold distance may be 10 mm. The area in each of the selected one or more 2D images may be a circle having a radius of 10 mm and a center at the corresponding pixel. The area in the first 2D image may be a circle having a radius of 10 mm and a center at the preliminary seed point. In some embodiments, the threshold distance may be a chess board distance having a number of pixels. For example, the area in each of the selected one or more 2D images may be a square having a center at the corresponding pixel and four sides with a length of 2T+1 pixels, wherein T refers to the number of pixels of the threshold distance. The area in the first 2D image may be a square having a center at the preliminary seed point and four sides with a length of 2T+1 pixels.

In 1240, the final point determination module 530 may determine an area in the first 2D image based on the preliminary seed point and the threshold distance. For example, the final point determination module 530 may determine an area including the pixels that are within a threshold distance from the preliminary seed point.

In 1250, the final point determination module 530 may determine the gray values of the pixels in the determined areas in the selected one or more 2D images and the determined area in the first 2D image.

In 1260, the final point determination module 530 may determine, in the determined areas in the selected one or more 2D images and the determined area in the first 2D image, a pixel having one of: the maximum gray value among the gray values, the minimum gray value among the gray values, or an average value of the gray values. For example, the final point determination module 530 may select a pixel with the maximum gray value if a final seed point inside the ROI corresponding to the VOI is needed. As another example, the final point determination module 530 may select a pixel with a minimum gray value of a final seed point outside the ROI corresponding to the VOI is needed.

In 1270, the final point determination module 530 may designate the determined pixel as the final seed point.

It should be noted that the above description of the flowchart 1200 is merely provided for illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional steps (e.g., a storing step) may be added elsewhere in process 1200.

Figure 13:
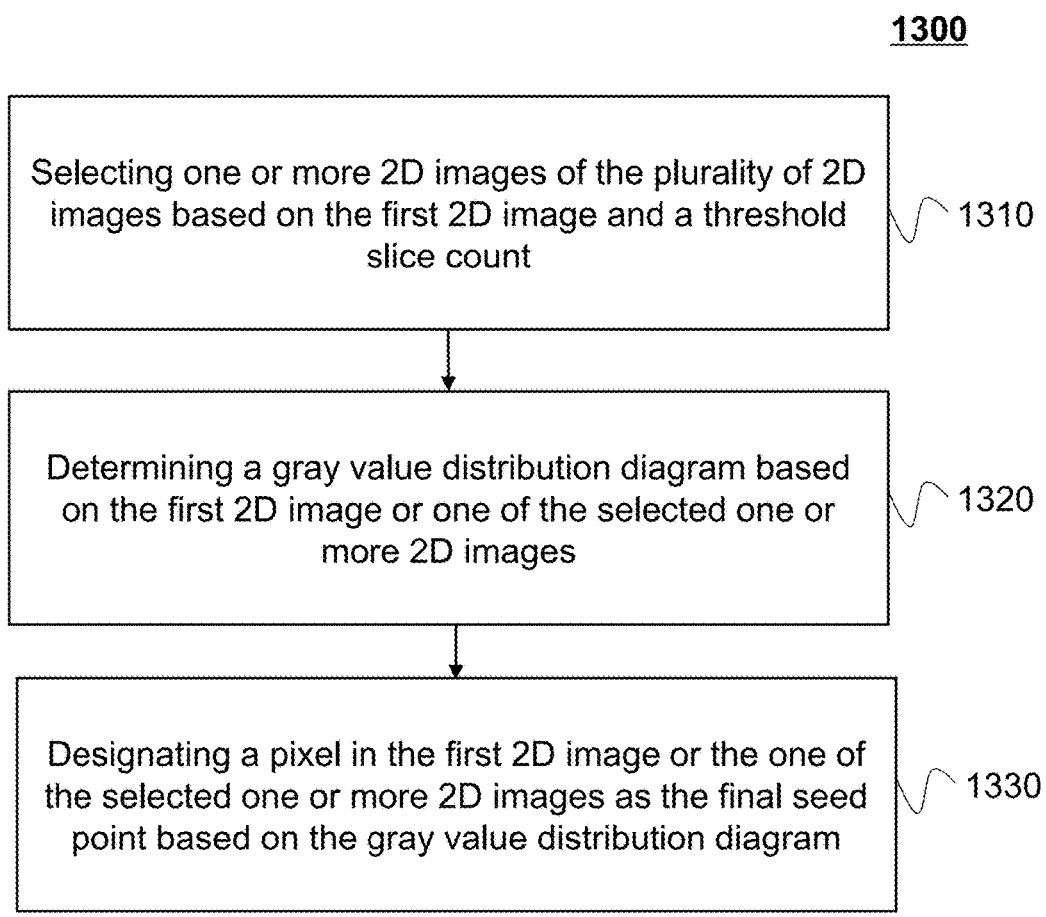
FIG. 13 is a flowchart illustrating an exemplary process for determining a final seed point according to some embodiments of the present disclosure.

FIG. 13 is a flowchart illustrating an exemplary process for determining a final seed point according to some embodiments of the present disclosure. The process 1300 may be implemented in the imaging system 100 illustrated in FIG. 1. For example, the process 1300 may be stored in the storage device 150 and/or the storage 220 as a form of instructions (e.g., an application), and invoked and/or executed by the processing device 140 (e.g., the processor 210 illustrated in FIG. 2, or one or more modules in the processing device 140 illustrated in FIG. 5). The operations of the illustrated process presented below are intended to be illustrative. In some embodiments, the process 1300 may be accomplished with one or more additional operations not described, and/or without one or more of the operations discussed. Additionally, the order in which the operations of the process 1300 as illustrated in FIG. 13 and described below is not intended to be limiting. In some embodiments, step 630 of process 600 illustrated in FIG. 6 may be performed according to process 1300.

In 1310, the final point determination module 530 may select, from the plurality of 2D images, one or more 2D images close to the first 2D image. The plurality of 2D images may be arranged in a spatial order (e.g., as described elsewhere in this disclosure in connection with FIG. 7). The selected one or more 2D images may be within a threshold slice count away from the first 2D image. For example, as shown in FIG. 7, the first 2D image may be image 714, and the threshold slice count may be 2. The final point determination module 530 may select one or more (or all) 2D images from images 711, 712, 713, 715, 716, and 717, which fall within the range of 2 image slices away from the first 2D image (i.e., image 714). In some embodiments, the final point determination module 530 may select one or more 2D images from the images that fall within the range of twice (or multiple times) of the threshold slice count away from the first 2D image. For example, as shown in FIG. 7, the first 2D image may be image 714, and the threshold slice count may be 2. The final point determination module 530 may select one or more (or all) 2D images from images 709, 710, 711, 712, 713, 715, 716, 717, 718, and 719, which fall within the range of 4 (i.e., twice of the threshold slice account) image slices away from the first 2D image (i.e., image 714).

In 1320, the final point determination module 530 may determine a gray value distribution diagram based on the first 2D image or one of the selected one or more 2D images. In some embodiments, the final point determination module 530 may determine a gray value distribution diagram of the pixels in the first 2D image (or the one of the selected one or more 2D images). Alternatively, the final point determination module 530 may determine a gray value distribution diagram relating to a portion of pixels in the first 2D image (or the one of the selected one or more 2D images). For example, the final point determination module 530 may determine, in the one of the selected one or more 2D images, a pixel corresponding to the preliminary seed point. The corresponding pixel corresponding to the preliminary seed point in the selected 2D image may be an orthographic projection of the preliminary seed point onto the selected 2D image. The final point determination module 530 may determine, in the one of the selected one or more 2D images, an area that includes the corresponding pixel (e.g., a rectangular region having the corresponding pixel as its center). The final point determination module 530 may determine a gray value distribution diagram of the pixels in the determined area in the one of the selected one or more 2D images. As another example, the final point determination module 530 may determine, in the first 2D image, an area that includes the preliminary seed point (e.g., a rectangular region having the preliminary seed point as its center). The final point determination module 530 may determine a gray value distribution diagram of the pixels in the determined area in the first 2D image. To determine the gray value distribution diagram, the final point determination module 530 may determine a curve by taking the gray value as the horizontal coordinate and the number of pixels as the vertical coordinate.

In 1330, the final point determination module 530 may designate a pixel in the first 2D image or the one of the selected one or more 2D images as the final seed point based on the gray value distribution diagram. For example, if there are two peaks in the curve of the gray value distribution diagram relating to the first 2D image (or the one of the selected one or more 2D images), the final point determination module 530 may determine the final seed point based on a point of which the vertical coordinates is minimum among points between the two peaks on the curve. The final point determination module 530 may determine, in the first 2D image (or the one of the selected one or more 2D images), a pixel of which the gray value is equal to the horizontal coordinate of the determined point on the curve as the final seed point. In some embodiments, if the first 2D image (or the one of the selected one or more 2D images) includes more than one pixel of which the gray value is equal to the horizontal coordinate of the determined point on the curve, the final point determination module 530 may select a pixel from the more than one pixel based on a rule. For example, the final point determination module 530 may select, from the more than one pixel, a pixel that is the closest to the top-left vertex of the first 2D image (or the one of the selected one or more 2D images).

Figure 14:
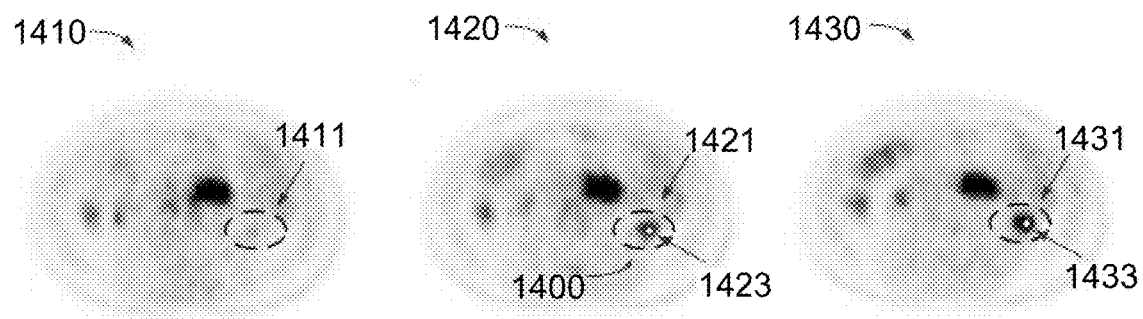
FIG. 14 is a schematic diagram illustrating a final seed point in a 2D image according to some embodiments of the present disclosure.

FIG. 14 is a schematic diagram illustrating a final seed point in a 2D image according to some embodiments of the present disclosure. The 2D images 1410-1430 shown in FIG. 14 are three axial-plane images included in a 3D image. A region 1411 refers to an ROI corresponding to a VOI 1400 (e.g., a tumor) in the image 1410. A region 1421 refers to an ROI corresponding to the VOI 1400 in the image 1420. A region 1431 refers to an ROI corresponding to the VOI 1400 in the image 1430.

The preliminary point determination module 520 may determine the preliminary seed point 1423 in the ROI 1421 in the image 1420. Merely by way example, the final point determination module 530 may determine the final seed point based on process 1200 illustrated in FIG. 12. The threshold slice count may be equal to 10. The final point determination module 530 may determine 22 2D images that are within 10 image slices away from the first 2D image. The final point determination module 530 may select one or more 2D images (e.g., the image 1410 and the image 1430) from the determined 22 2D images. The final point determination module 530 may determine, in each of the selected one or more 2D images, a corresponding pixel corresponding to the preliminary seed point 1423. The final point determination module 530 may determine, in each of the selected one or more 2D images, an area including a plurality of pixels that are within 10 pixels (i.e., a threshold distance) from the corresponding pixel. The final point determination module 530 may determine, in the image 1420, an area including a plurality of pixels that are within 10 pixels from the preliminary seed point 1423. The final point determination module 530 may determine a plurality of gray values of pixels in the areas in the selected one or more 2D images and the area in the image 1420. The final point determination module 530 may determine, in the areas in the selected one or more 2D images and the area in the image 1420, a pixel with the maximum gray value among the plurality of gray values as the final seed point. As shown in FIG. 13, the final seed point 1433 may be in the ROI 1431 in the image 1430. Because of the accuracy and the stability of the techniques for determining a VOI in a 3D image described in the present disclosure, if the final point determination module 530 determines the preliminary seed point in the ROI 1411 in the image 1410, the result of determining the final seed point may be same or substantially same as the result of the final seed point 1433.

FIG. 15 is a flowchart illustrating an exemplary process for determining a VOI in a 3D image based on a final seed point according to some embodiments of the present disclosure. Process 1500 may be implemented in the imaging system 100 illustrated in FIG. 1. For example, the process 1500 may be stored in the storage device 150 and/or the storage 220 as a form of instructions (e.g., an application), and invoked and/or executed by the processing device 140 (e.g., the processor 210 illustrated in FIG. 2, or one or more modules in the processing device 140 illustrated in FIG. 5). The operations of the illustrated process presented below are intended to be illustrative. In some embodiments, process 1500 may be accomplished with one or more additional operations not described, and/or without one or more of the operations discussed. Additionally, the order in which the operations of the process 1500 as illustrated in FIG. 15 and described below is not intended to be limiting. In some embodiments, step 640 of process 600 illustrated in FIG. 6 may be performed according to process 1500.

Step 640 may initiate an iteration process for segmenting the 3D image to obtain the VOI based on the final seed point. The iteration process may include a plurality of iterations (e.g., each of the iterations may include steps 1530-1585). In some embodiments, process 1500 may relate to a threshold-based segmentation algorithm.

For brevity, the description of process 1500 may take the segmentation of a 3D image to obtain a VOI as an example. It should be noted that the description of process 1500 described below is merely some examples or implementations. For persons having ordinary skills in the art, the description of process 1500 may be applied to other similar situations, such as the segmentation of a 2D image to obtain an ROI.

In 1510, the segmentation module 540 may determine a preliminary segmentation threshold based on the final seed point. For example, the preliminary segmentation threshold may be equal to the gray value of the final seed point. As another example, the segmentation module 540 may determine a region that includes the final seed point (e.g., a rectangular region having the final seed point as its center) in the second 2D image. The segmentation module 540 may determine an average value of gray values of at least one pixel in the region as the preliminary segmentation threshold. As still another example, the segmentation module 540 may determine a gray value distribution diagram (e.g., a gray histogram) based on the second 2D image. The segmentation module 540 may determine a curve by taking the gray value as the horizontal coordinate and the number of pixels as the vertical coordinate. If there are two peaks in the curve of the gray value distribution diagram, the segmentation module 540 may determine the preliminary segmentation threshold based on a point of which the vertical coordinates is the minimum among points between the two peaks on the curve. The segmentation module 540 may determine the horizontal coordinate of the determined point on the curve as the preliminary segmentation threshold (e.g., as described elsewhere in this disclosure in connection with FIG. 16).

In 1520, the segmentation module 540 may obtain a weight associated with the VOI in the 3D image. The weight may be used for determining a new segmentation threshold. The weight may be set by a user (e.g., a doctor, an imaging engineer) of the imaging system 100.

In 1530, the segmentation module 540 may determine a foreground region including the VOI and a background region without the VOI by segmenting the 3D image based on a previous segmentation threshold. The previous segmentation threshold may be a segmentation threshold determined in a previous iteration. In a first iteration of the iteration process, the previous segmentation threshold may be the preliminary segmentation threshold determined in 1510. Merely by way of example, the segmentation module 540 may segment the 3D image to obtain the foreground region and the background region using a region-growing algorithm. The segmentation module 540 may determine the final seed point as a growing seed point of the region-growing algorithm.

In some embodiments, the segmentation module 540 may divide the 3D image into a region including gray values less than the previous segmentation threshold (e.g., the foreground region if the VOI is relatively dark in the 3D image) and a region including gray values greater than or equal to the previous segmentation threshold (e.g., the background region if the VOI is relatively dark in the 3D image).

In 1540, the segmentation module 540 may determine a first average value of gray values of pixels in the foreground region and a second average value of gray values of pixels in the background region.

In 1550, the segmentation module 540 may determine a new segmentation threshold based on the first average value, the second average value, and the weight. In some embodiments, the new segmentation may be determined based on Equation (1) below:

$$T = w \times v_1 + (1-w) \times v_2, \quad (1)$$

where T represents the new segmentation threshold; w represents the weight; $v_1$ represents the first average value; and $v_2$ represents the second average value.

In 1560, the segmentation module 540 may determine whether a difference between the previous segmentation threshold and the new segmentation threshold is less than a threshold of difference (e.g., 0.1). In response to a determination that the difference between the previous segmentation threshold and the new segmentation threshold is less than the threshold of difference, process 1500 may proceed to 1590 to designate the foreground region as the VOI in the 3D image. In response to a determination that the difference between the previous segmentation threshold and the new segmentation threshold is equal to or greater than the threshold of difference, process 1500 may proceed to 1570.

In 1570, the segmentation module 540 may determine whether an iteration count of iterations performed is greater than a threshold iteration count (e.g., 10 iterations). In response to a determination that the iteration count of iterations performed is greater than the threshold iteration count, process 1500 may proceed to 1580. In response to a determination that the iteration count of iterations that have been performed is less than or equal to the threshold iteration count, process 1500 may proceed to 1530 to initiate a new iteration.

In 1580, the segmentation module 540 may determine whether the weight is greater than a threshold weight (e.g., 0.5). In response to a determination that the weight is greater than the threshold weight, process 1400 may proceed to 1590 to designate the foreground region as the VOI in the 3D image. In response to a determination that the weight is less than or equal to the threshold weight, process 1500 may proceed to 1585 to update the weight and then proceed to 1530 to initiate a new iteration. In some embodiments, the segmentation module 540 may update the weight by increasing the weight (e.g., increasing the weight by 0.05). In some embodiments, step 1570 may be omitted. When step 1570 is omitted, process 1500 may proceed to 1580 in response to the determination that the difference between the previous segmentation threshold and the new segmentation threshold is equal to or greater than the threshold of difference.

In some embodiments, steps 1580 and 1585 may be omitted. When steps 1580 and 1585 are omitted, process 1500 may proceed to 1590 in response to the determination that the iteration count of iterations that have been performed is greater than the threshold iteration count.

In some embodiments, steps 1570, 1580, and 1585 may be omitted. When steps 1570, 1580, and 1585 are omitted, process 1500 may proceed to 1530 to initiate a new iteration in response to the determination that the difference between the previous segmentation threshold and the new segmentation threshold is equal to or greater than the threshold of difference.

Figure 16:
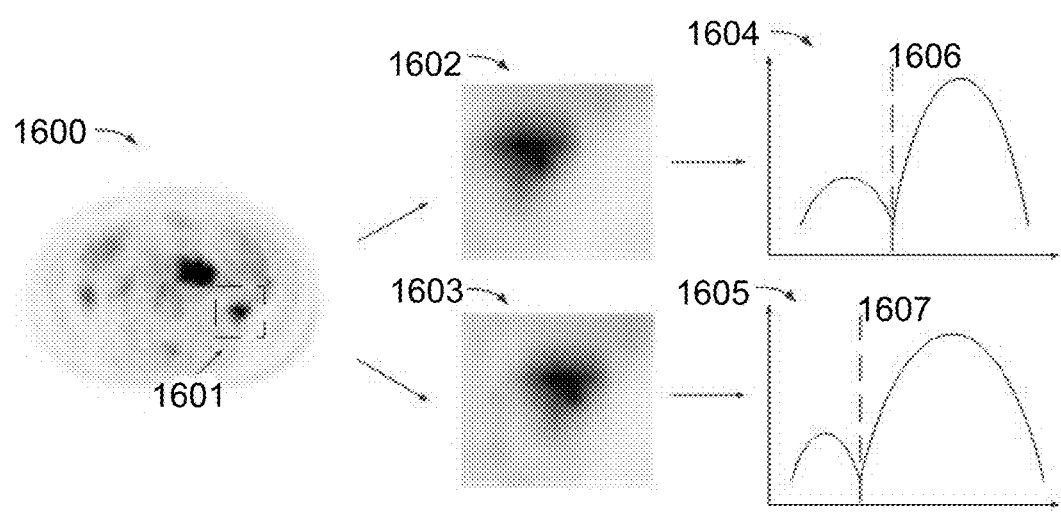
FIG. 16 is a schematic diagram illustrating a comparison between the segmentation results using a threshold-based segmentation algorithm and using the segmentation algorithm according to some embodiments of the present disclosure.

FIG. 16 is a schematic diagram illustrating a comparison between the segmentation results using a threshold-based segmentation algorithm and using the segmentation algorithm according to some embodiments of the present disclosure. Image 1600 shown in the FIG. 16 is a 2D image of the 2D images included in a 3D image. An ROI 1601 is an ROI corresponding to a VOI in the 3D image. The processing device 140 may determine the preliminary seed point in the ROI 1601.

In the threshold-based segmentation algorithm, an area 1402 including the preliminary seed point is determined. The area is a rectangle area having the preliminary seed point as its center. The gray value distribution of the pixels of the area 1602 is determined, which is shown as diagram 1604. The horizontal axis of the diagram 1604 represents gray values, and the vertical axis of the diagram 1604 represents the number of the pixels in the area 1602. The gray value 1606 is a segmentation threshold to be used to segment the 3D image to obtain the VOI.

In the segmentation algorithm according to some embodiments of the present disclosure, the segmentation module 540 may segment the 3D image to obtain the VOI based a final seed point instead of the preliminary seed point. For example, the final point determination module 530 may determine the final seed point based on the preliminary seed point in the ROI 1601 using the techniques described in the present disclosure. The segmentation module 540 may determine an area 1603 including the final seed point. The area may be a rectangle area with a center at the final seed point. The segmentation module 540 may determine gray values of pixels of the area 1603. The segmentation module 540 may also generate a gray distribution diagram 1605 based on the gray values of pixels of the area 1603. The horizontal axis of the gray distribution diagram 1605 represents gray values, and the vertical axis of the gray distribution diagram 1605 represents the number of the pixels in the area 1603. The gray value 1607 is a segmentation threshold to be used to segment the 3D image to obtain the VOI.

Compared with the segmentation threshold 1606, the segmentation threshold 1607 is closer to a true segmentation threshold. If the preliminary point determination module 520 determines a different preliminary seed point in a 2D image different from the image 1600, the final point determination module 530 may determine a same or substantially same final seed point, which indicates the accuracy and the stability of the techniques described in the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code,) or combining software and hardware implementation that may all generally be referred to herein as a "unit," "module," or "system." Furthermore, aspects of the present disclosure may take the form of a computer program product embodied in one or more computer readable medium having computer readable program code embodied thereon.

A computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for image segmentation, comprising:
a storage device storing a set of instructions; and one or more processors configured to communicate with the storage device, wherein when executing the set of instructions, the one or more processors are configured to cause the system to:
- acquire a three-dimensional (3D) image including a plurality of two-dimensional (2D) images arranged in a spatial order;
- determine a preliminary seed point in a first 2D image of the plurality of 2D images;
- determine, based on the preliminary seed point, a final seed point in a second 2D image of the plurality of 2D images;
- segment, by the at least one processor, the 3D image or one or more of the plurality of 2D images based on the final seed point; and
- generate, by the at least one processor, a volume of interest (VOI) according to a result of the segmentation.

2. The system of claim 1, wherein to determine the final seed point in the second 2D image of the plurality of 2D images based on the preliminary seed point, the one or more processors are configured to cause the system to:
- determine a preliminary VOI based on the preliminary seed point;
- determine a characteristic point of the preliminary VOI, the characteristic point of the preliminary VOI being a geometric center of the preliminary VOI or a center of gravity of the preliminary VOI; and
- designate the characteristic point of the preliminary VOI as the final seed point.

3. The system of claim 1, wherein to determine the final seed point in the second 2D image of the plurality of 2D images based on the preliminary seed point, the one or more processors are configured to cause the system to:
- initiate an iteration process for determining the final seed point, the iteration process including a plurality of iterations, each iteration of the plurality of iterations including:
  - determining, based on a previous seed point, a preliminary VOI in the 3D image, the previous seed point being the preliminary seed point in a first iteration of the plurality of iterations or a seed point determined in a previous iteration;
  - determining, based on the preliminary VOI, a next seed point, the next seed point being a characteristic point of the preliminary VOI;
  - displaying the next seed point to a user;
  - receiving, from the user, an input related to the next seed point; and
  - based on the received input, terminating the iteration process or initiating a new iteration of the iteration process; and
- designate the seed point determined in a last iteration of the plurality of iterations as the final seed point.

4. The system of claim 1, wherein to determine the final seed point in the second 2D image of the plurality of 2D images based on the preliminary seed point, the one or more processors are configured to cause the system to:
- select, from the plurality of 2D images, one or more 2D images close to the first 2D image, the selected one or more 2D images being within a threshold slice count away from the first 2D image;
- determine, in each of the selected one or more 2D images, a pixel corresponding to the preliminary seed point;
- determine, in each of the selected one or more 2D images, an area including a plurality of pixels that are within a threshold distance from the corresponding pixel;
- determine, in the first 2D image, an area including a plurality of pixels that are within the threshold distance from the preliminary seed point;
- determine gray values of pixels in the determined areas in the selected one or more 2D images and the determined area in the first 2D image;
- determine, in the determined areas in the selected one or more 2D images and the determined area in the first 2D image, a pixel having one of: a maximum value among the gray values, a minimum value among the gray values, or an average value of the gray values; and
- designate the determined pixel as the final seed point.

5. The system of claim 4, wherein
the threshold distance is a Euclidean distance, the area in each of the selected one or more 2D images is a circle having a radius of the threshold distance and a center at the corresponding pixel to the preliminary seed point, and the area in the first 2D image is a circle with the radius of the threshold distance centered at the preliminary seed point, or
the threshold distance is a chess board distance having a number of pixels, the area in the each of the selected one or more 2D images being a square having a center at the corresponding pixel to the preliminary seed point and four sides with a length of 2T+1 pixels, T being the number of pixels of the threshold distance, the area in the first 2D image being a square having a center at the preliminary seed point and four sides with a length of 2T+1 pixels.

6. The system of claim 1, wherein the one or more processors are further configured to cause the system to:
- generate one or more regions of interest (ROIs) based on a result of the segmentation of the one or more 2D images of the plurality of the 2D images; and
- generate the VOI based on the one or more ROIs.

7. A method for image segmentation implemented on a computing device having at least one processor and a storage device, the method comprising:
- acquiring, by the at least one processor, a three-dimensional (3D) image including a plurality of two-dimensional (2D) images arranged in a spatial order;
- determining, by the at least one processor, a preliminary seed point in a first 2D image of the plurality of 2D images;
- determining, by the at least one processor, a final seed point in a second 2D image of the plurality of 2D images based on the preliminary seed point;
- segmenting, by the at least one processor, the 3D image or one or more of the plurality of 2D images based on the final seed point; and
- generating, by the at least one processor, a volume of interest (VOI) according to a result of the segmentation.

8. The method of claim 7, wherein the determining of the final seed point in the second 2D image of the plurality of 2D images based on the preliminary seed point comprises:
- determining, by the at least one processor, a preliminary VOI based on the preliminary seed point;
- determining, by the at least one processor, a characteristic point of the preliminary VOI; and
- designating, by the at least one processor, the characteristic point of the preliminary VOI as the final seed point.

9. The method of claim 8, wherein the characteristic point of the preliminary VOI is a geometric center of the preliminary VOI or a center of gravity of the preliminary VOI.

10. The method of claim 7, wherein the determining of the final seed point in the second 2D image of the plurality of 2D images based on the preliminary seed point comprises:
  initiating, by the at least one processor, an iteration process for determining the final seed point, the iteration process including a plurality of iterations, each iteration of the plurality of iterations including:
    determining, by the at least one processor, a preliminary VOI in the 3D image based on a previous seed point, the previous seed point being the preliminary seed point in a first iteration of the plurality of iterations or a seed point determined in a previous iteration; and
    determining, by the at least one processor, a next seed point based on the preliminary VOI, the next seed point being a characteristic point of the preliminary VOI; and
  designating, by the at least one processor, the seed point determined in a last iteration of the plurality of iterations as the final seed point.

11. The method of claim 10, wherein at least one of the plurality of iterations further includes:
  displaying, by the at least one processor, the seed point determined in the at least one of the plurality of iterations to a user;
  receiving, by the at least one processor, an input related to the seed point determined in the at least one of the plurality of iterations from the user; and
  terminating, by the at least one processor, the iteration process based on the received input.

12. The method of claim 10, wherein at least one of the plurality of iterations further includes:
  determining, by the at least one processor, the number of iterations that have been performed;
  determining, by the at least one processor, whether the number of iterations that have been performed is equal to or greater than a threshold; and
  terminating, by the at least one processor, the iteration process based on a determination that the number of iterations that have been performed is equal to or greater than the threshold.

13. The method of claim 7, wherein the determining of the final seed point in the second 2D image of the plurality of 2D images based on the preliminary seed point comprises:
  selecting, by the at least one processor, one or more 2D images close to the first 2D image from the plurality of 2D images, the selected one or more 2D images being within a threshold slice count away from the first 2D image;
  determining, by the at least one processor, gray values of pixels in the selected one or more 2D images and the first 2D image;
  determining, in the selected one or more 2D images and the first 2D image, a pixel having one of: a maximum value among the gray values, a minimum value among the gray values, or an average value of the gray values; and
  designating, by the at least one processor, the determined pixel as the final seed point.

14. The method of claim 7, wherein the determining of the final seed point in the second 2D image of the plurality of 2D images based on the preliminary seed point comprises:
  selecting, by the at least one processor, one or more 2D images close to the first 2D image from the plurality of 2D images, the selected one or more 2D images being within a threshold slice count away from the first 2D image;
  determining, by the at least one processor, a pixel corresponding to the preliminary seed point in each of the selected one or more 2D images;
  determining, by the at least one processor, an area including a plurality of pixels that are within a threshold distance from the corresponding pixel in each of the selected one or more 2D images;
  determining, by the at least one processor, an area including a plurality of pixels that are within the threshold distance from the preliminary seed point in the first 2D image;
  determining, by the at least one processor, gray values of pixels in the determined areas in the selected one or more 2D images and the determined area in the first 2D image;
  determining, in the determined areas in the selected one or more 2D images and the determined area in the first 2D image, a pixel having one of: a maximum value among the gray values, a minimum value among the gray values, or an average value of the gray values; and
  designating, by the at least one processor, the determined pixel as the final seed point.

15. The method of claim 14, wherein
  the threshold distance is a Euclidean distance, the area in each of the selected one or more 2D images is a circle having a radius of the threshold distance and a center at the corresponding pixel to the preliminary seed point, and the area in the first 2D image is a circle with the radius of the threshold distance centered at the preliminary seed point, or
  the threshold distance is a chess board distance having a number of pixels, the area in the each of the selected one or more 2D images being a square having a center at the corresponding pixel to the preliminary seed point and four sides with a length of 2T+1 pixels, T being the number of pixels of the threshold distance, and the area in the first 2D image being a square having a center at the preliminary seed point and four sides with a length of 2T+1 pixels.

16. The method of claim 7,
  further comprising generating, by the at least one processor, one or more regions of interest (ROIs) based on a result of the segmentation of the one or more 2D images of the plurality of 2D images; and
  generating, by the at least one processor, the VOI based on the generated one or more ROIs.

17. The method of claim 7, wherein the determining of the final seed point in the second 2D image of the plurality of 2D images based on the preliminary seed point comprising:
  selecting, by the at least one processor, one or more 2D images close to the first 2D image from the plurality of 2D images, the selected one or more 2D images being within a threshold slice count away from the first 2D image;
  determining, by the at least one processor, a gray value distribution diagram based on the first 2D image or one of the selected one or more 2D images; and
  designating, by the at least one processor, a pixel in first 2D image or one of the selected one or more 2D images as the final seed point based on the gray value distribution diagram.

18. The method of claim 7, wherein the segmentation comprising:
  determining, by the at least one processor, a preliminary segmentation threshold based on the final seed point;
  obtaining, by the at least one processor, a weight associated with the VOI;

initiating, by the at least one processor, an iteration process for determining the VOI, the iteration process including a plurality of iterations, each iteration of the plurality of iterations including:
- determining, by the at least one processor, a foreground region and a background region by segmenting the 3D image based on a region-growing algorithm and a previous segmentation threshold, the previous segmentation threshold being the preliminary segmentation threshold in a first iteration of the plurality of iterations or a segmentation threshold determined in a previous iteration;
- determining, by the at least one processor, a first average value of gray values of pixels in the foreground region and a second average value of gray values of pixels in the background region; and
- determining, by the at least one processor, a new segmentation threshold based on the first average value, the second average value, and the weight; and the generation of VOI based on the result of the segmentation comprising designating, by the at least one processor, the foreground region determined in a last iteration of the plurality of iterations as the VOI in the 3D image.

19. The method of claim 18, wherein at least one of the plurality of iterations further includes:
- determining, by the at least one processor, whether a difference between the previous segmentation threshold and the new segmentation threshold is less than a threshold of difference; and
- terminating, by the at least one processor, the iteration process in response to a determination that the difference between the previous segmentation threshold and the new segmentation threshold is less than the threshold of difference.

20. The method of claim 18, wherein at least one of the plurality of iterations further includes:
- determining, by the at least one processor, whether an iteration count of iterations that have been performed is greater than a threshold iteration count; and
- terminating, by the at least one processor, the iteration process in response to a determination that the iteration count of iterations that have been performed is greater than the threshold iteration count.

21. The method of claim 18, wherein at least one of the plurality of iterations further includes:
- determining, by the at least one processor, whether the weight is greater than a threshold weight; and
- terminating, by the at least one processor, the iteration process in response to a determination that the weight is greater than the threshold weight.

* * * * *